United States Patent
Beauchamp

(10) Patent No.: US 11,024,177 B1
(45) Date of Patent: Jun. 1, 2021

(54) METHOD AND SYSTEM FOR VEHICLE-TO-PEDESTRIAN COLLISION AVOIDANCE

(71) Applicant: Bastien Beauchamp, Outremont (CA)

(72) Inventor: Bastien Beauchamp, Outremont (CA)

(*) Notice: Subject to any disclaimer, the term of this patent is extended or adjusted under 35 U.S.C. 154(b) by 0 days.

(21) Appl. No.: 16/476,461

(22) PCT Filed: May 9, 2019

(86) PCT No.: PCT/CA2019/050613
§ 371 (c)(1),
(2) Date: Jul. 8, 2019

(87) PCT Pub. No.: WO2019/213763
PCT Pub. Date: Nov. 14, 2019

Related U.S. Application Data

(60) Provisional application No. 62/669,437, filed on May 10, 2018, provisional application No. 62/792,950, filed on Jan. 16, 2019.

(51) Int. Cl.
*H04W 4/40* (2018.01)
*G08G 1/16* (2006.01)
(Continued)

(52) U.S. Cl.
CPC ............ *G08G 1/166* (2013.01); *H04W 4/029* (2018.02); *H04W 4/40* (2018.02); *H04W 76/50* (2018.02)

(58) Field of Classification Search
CPC ........ G08G 1/166; H04W 76/50; H04W 4/40; H04W 4/029
See application file for complete search history.

(56) References Cited

U.S. PATENT DOCUMENTS 8,547,249 B2 * 10/2013 David .................... G08G 1/166
340/903
9,421,909 B2    8/2016 Strickland et al.
(Continued)

FOREIGN PATENT DOCUMENTS

CN    20170025179 A    3/2017
CN    106882143 A    6/2017
(Continued)

OTHER PUBLICATIONS

The international Search Report and the Written Opinion, PCT/CA2019/050613, dated Jul. 18, 2019.

*Primary Examiner* — Munear T Akki
(74) *Attorney, Agent, or Firm* — Howard M. Gitten; Lewis Brisbois Bisgaard & Smith LLP

(57) ABSTRACT

A method and a system for vehicle-to-pedestrian collision avoidance system, the system comprising participants consisting of Long-Term Evolution (LTE)-capable user equipment (UE) terminals physically linked to at least one vehicle and at least one pedestrian; wherein a spatiotemporal positioning of the terminals is determined from Long Term Evolution (LTE) cellular radio signals mediated by Long-Term Evolution (LTE) cellular base stations (BS) and a Location Service Client (LCS) server including an embedded Artificial Intelligence algorithm comprising a Recurrent Neural Network (RNN) algorithm and analyzes the spatiotemporal positioning of the terminals and determines the likely future trajectory and communicates the likely future trajectory of the participants to the terminals physically linked to the pedestrian; the terminals physically linked to the pedestrian include an embedded Artificial Intelligence algorithm comprising a Conditional Random Fields (CRFs) algorithm to determine if the likely future trajectory of the pedestrian is below a vehicle-to-pedestrian proximity threshold limit and, if this condition is reached, communi- (Continued)

cates a collision-avoidance emergency signal to the at least one pedestrian and/or vehicle that meet the proximity threshold limit.

22 Claims, 15 Drawing Sheets

(51) Int. Cl.
*H04W 76/50* (2018.01)
*H04W 4/029* (2018.01)

(56) References Cited

U.S. PATENT DOCUMENTS

| | | | |
|---|---|---|---|
| 10,007,269 B1 | 6/2018 | Gray | |
| 2009/0002197 A1* | 1/2009 | Cemper | G08B 21/22 |
| | | | 340/989 |
| 2010/0100324 A1* | 4/2010 | Caminiti | G08G 1/164 |
| | | | 701/301 |
| 2011/0001635 A1* | 1/2011 | Akens | G08G 1/052 |
| | | | 340/936 |
| 2011/0246156 A1 | 10/2011 | Zecha et al. | |
| 2014/0132404 A1* | 5/2014 | Katoh | B60R 21/013 |
| | | | 340/436 |
| 2016/0075332 A1* | 3/2016 | Edo-Ros | B60T 7/22 |
| | | | 701/70 |
| 2017/0188391 A1 | 6/2017 | Rajagopal et al. | |
| 2018/0105107 A1* | 4/2018 | Hassan-Shafique | |
| | | | G01S 17/931 |
| 2019/0268726 A1* | 8/2019 | Jiang | G01S 5/0027 |
| 2020/0035103 A1* | 1/2020 | Siboni | G08G 1/005 |

FOREIGN PATENT DOCUMENTS

| | | |
|---|---|---|
| CN | 106997689 A | 8/2017 |
| CN | 107731009 A | 2/2018 |
| CN | 107798916 A | 3/2018 |
| KR | 1020140103983 | 8/2014 |
| KR | 20160087277 A | 7/2016 |
| KR | 20160147559 A | 12/2016 |
| WO | WO2017135998 A | 8/2017 |

* cited by examiner

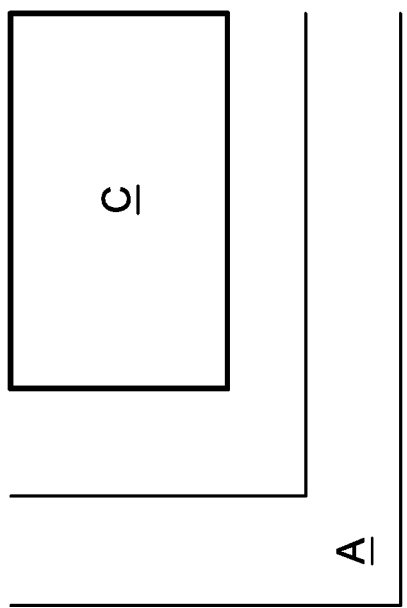
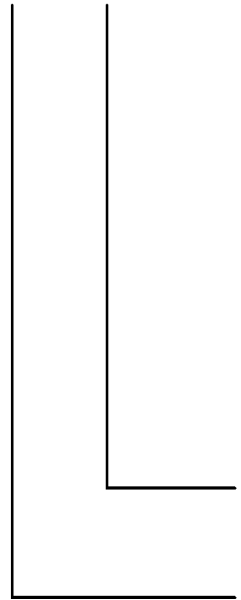
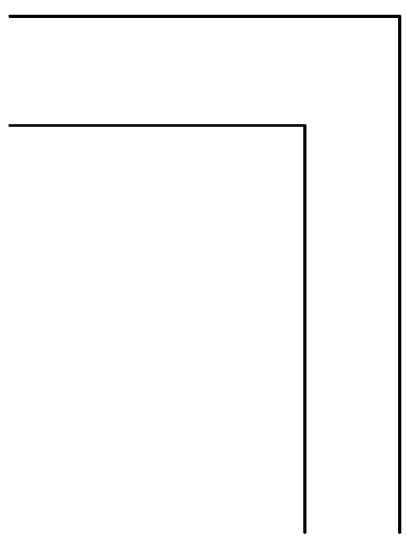
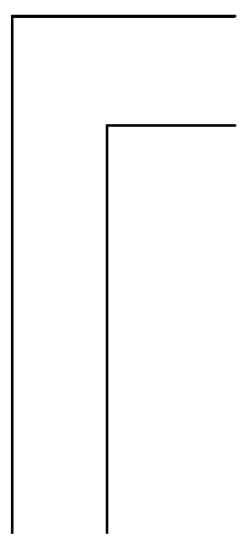
FIG. 3

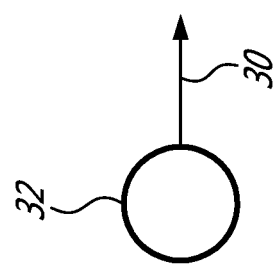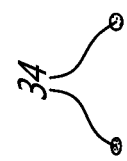
FIG. 4

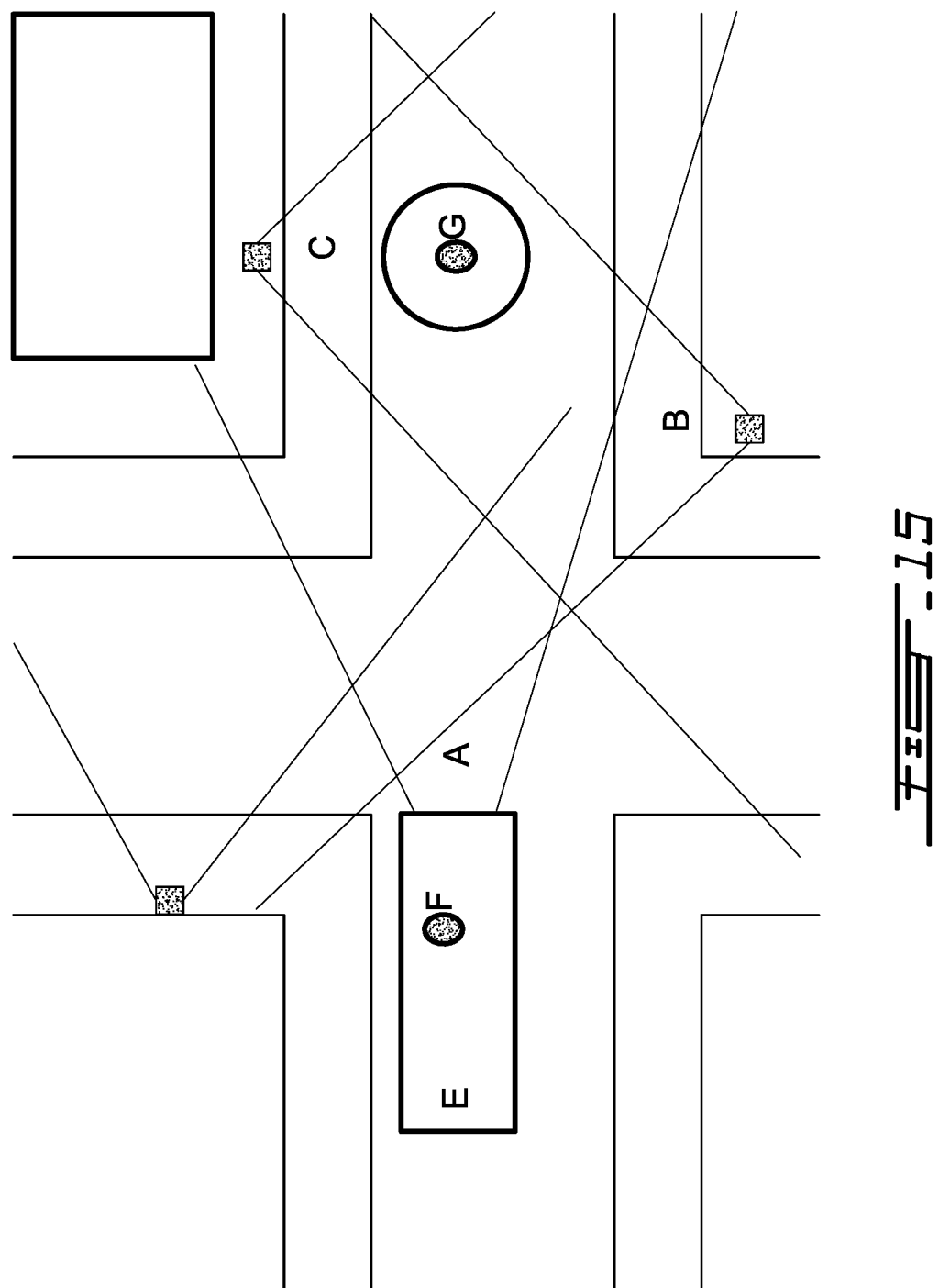

METHOD AND SYSTEM FOR VEHICLE-TO-PEDESTRIAN COLLISION AVOIDANCE

CROSS-REFERENCE TO RELATED APPLICATIONS

This application is a National Entry Application of PCT application no. CA2019/050613 filed on May 9, 2019, which itself claims benefit of U.S. provisional application Ser. No. 62/669,437, filed on May 10, 2018 and U.S. provisional application Ser. No. 62/792,950, filed on Jan. 16, 2019. All documents above are incorporated herein in their entirety by reference.

FIELD OF THE INVENTION

The present invention relates to the field of road safety. More specifically, the present invention relates to a method and a system for collision avoidance between vehicles and pedestrians.

BACKGROUND OF THE INVENTION

Position-based services, such as emergency call positioning for example, drive the development of localization techniques in wireless communications networks. Global Navigation Satellite System (GNSS)-enabled terminals are capable of determining outdoor positions within few meters of accuracy, and a number of applications and services in terminals take advantage of such accurate positioning.

In telecommunications, Long-Term Evolution (LTE) is a standard for wireless broadband communication for mobile devices and data terminals, based on Enhanced Data rates for GSM Evolution (GSM/EDGE) and Universal Mobile Telecommunications System (UMTS)/High Speed Packet Access (HSPA) technologies. Positioning support in Long-Term Evolution (LTE) for 4G cellular networks was introduced in 2008. It enables telecom operators to retrieve position information of users for location-based services and to meet regulatory emergency call positioning requirements.

There are several various techniques that may be used for determining the spatiotemporal position of a LTE-capable user equipment (UE). One of the most widely used techniques for positioning is based on relative positioning across an array of serving LTE base stations of known positions. Also, Global Positioning System (GPS) offers location information to an accuracy of 5 meters, but exhibits some urban coverage drawback, seconds-level measurement latencies, and high battery electrical consumption, which may limit the applicability of GPS for accurate vehicle-to-pedestrian collision avoidance.

In the Cell ID technique, the user equipment (UE) can be located using its serving cell coordinates; the coordinates can either be the base station (BS) coordinates or sector of a base station (BS) within a location area Code (LAC). The accuracy of this method relies on the serving cell radius, which however can be as large as 60 km in rural areas thus providing non-accurate results depending on the user equipment (UE) terminal position.

Several LTE-based techniques may be used to determine the exact spatiotemporal position of a LTE-capable user equipment (UE). In the received signal level (RSSI) technique, a user equipment (UE) measures the serving and the neighboring cell received signal intensities. This information can be used to calculate the distance between the user equipment (UE) and the neighboring base station (BS) of known position. If the signals from at least three base stations (BS) are received, triangulation can be applied to the RSSI technique to determine the exact position of the user equipment (UE), since the positions of the base stations (BS) are known to a high level of accuracy. As used herein, the term 'triangulation' is intended to refer to the geometrical tracing and measurement of a series of triangles in order to determine the distances and relative positions of points spread over a region comprising an array of base stations (BS), by measuring the relative lengths of each sides or by measuring the relative angles of each corners, of a triangular baseline. In the time difference of arrival (TDOA) technique, the time difference between each pair of received signals can be estimated by a receiver and the position from the intersection of the two hyperbolas can be determined. In general, the time difference of arrival (TDOA) measurement is made by measuring the difference in received phase at each signal in the antenna array. If the signals from at least three base stations (BS) are received, triangulation can be applied to the TDOA technique to determine the exact position of the user equipment (UE). The angle of arrival (AOA) method includes measuring the angle of arrival of a signal either from a base station (BS) or a user equipment (UE) using for example the antenna emissive patterns. In the angle of arrival (AOA) method, the delay of arrival at each element in the antenna array is measured directly and converted to an angle of arrival measurement. Furthermore, this technique is a method for determining the direction of propagation of a radio frequency wave incident on the transmitting aerial array. If the signals from at least three base stations (BS) are received, triangulation can be applied to the angle of arrival (AOA) technique to determine the exact position of the user equipment (UE). The time of arrival (TOA) technique uses the speed of light, the speed of radio wave propagation and the time of a signal arrival to calculate the distance to determine the actual user equipment (UE) position. If the signals from at least three base stations (BS) are received, triangulation can be applied to the time of arrival (TOA) technique to determine the exact position of the user equipment (UE).

In currently deployed Long-Term Evolution (LTE) networks, the User Equipment (UE) position is usually determined based on a combination of enhanced cell identity (E-CID), Observed Time Difference of Arrival (OTDOA) and Assisted Global Navigation Satellite Systems (GNSS) (A-GNSS) information from the User Equipment (UE). The level of positioning accuracy is on the order of tens of meters.

Observed Time Difference of Arrival (OTDOA) is a User Equipment (UE)-assisted method, in which the User Equipment (UE) measures the time of arrival (TOA) of specific Positioning Reference Signals (PRS) transmitted by cellular Base Stations (BS) and reports the measured Time of Arrival (TOA) estimates to the location server. The location server determines position of the User Equipment (UE) using multilateration based on the Time of Arrival (TOA) measurements of the Positioning Reference Signals (PRS) received from at least three base stations and known location of these base stations.

The positioning accuracy in Observed Time Difference of Arrival (OTDOA) method depends on various factors, such as for example network deployment, signal propagation condition, synchronization errors, and properties of Positioning Reference Signals (PRS). For 4G cellular (LTE) indoor users, positioning accuracy can be around 50 meters. For upcoming 5G systems, positioning requirements are much stringent, about 1 meter accuracy for both indoor and outdoor users which include humans, devices, machines, vehicles, etc. For a given deployment and propagation scenario, significant improvements in positioning accuracy is achievable by appropriately redesigning positioning reference signals for 5G radio access technology, termed as New Radio (NR).

5G NR (New Radio) is a new radio access technology (RAT) developed by 3GPP for the 5G (fifth generation) mobile network. It is meant to be the global standard for the air interface of 5G telecommunications networks. The 3rd Generation Partnership Project (3GPP) is a standards organization which develops protocols for mobile telephony. The 3GPP specification 38 series provides the technical details behind NR, the radio access technology (RAT) beyond LTE.

Precise and reliable localization is a topic of high interest for autonomous and unmanned vehicles, such as self-driving cars and drones for instance. Indeed, the automotive industry requires positioning accuracies at the cm-level, in order to enable vehicular use cases based on automated driving and road safety. Current localization technologies used for these critical applications are based on Global Navigation Satellite Systems (GNSS) for absolute positioning, and the combination of radars, cameras and inertial sensors for relative positioning. Nonetheless, the high implementation cost of these on-board sensors may prevent their adoption in certain applications. Thus, wireless networks dedicated to vehicular-to-everything (V2X) communications can also be exploited for positioning purposes. This is the case of fifth generation (5G) cellular networks, whose disruptive technologies are expected to enable high-accuracy localization.

Vehicle-to-everything (V2X) communication is the passing of information from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). The main motivations for V2X are road safety, traffic efficiency, and energy savings. There are two types of V2X communication technology depending on the underlying technology being used: WLAN-based, and cellular-based. Standardization of WLAN-based Vehicle-to-everything (V2X) systems supersedes that of cellular-based Vehicle-to-everything (V2X) systems. IEEE first published the specification of WLAN-based V2X (IEEE 802.11p) in 2012. It supports direct communication between vehicles (V2V) and between vehicles and infrastructure (V2I). In 2016, 3GPP published Vehicle-to-everything communication (V2X) specifications based on Long-Term Evolution (LTE) as the underlying technology. It is generally referred to as "cellular V2X" (C-V2X) to differentiate itself from the 802.11p based V2X technology. In addition to the direct communication (V2V, V2I), C-V2X also supports wide area communication over a cellular network (V2N). This additional mode of communication and native migration path to 5G are two main advantages over 802.11p based V2X system.

The combination of Global Navigation Satellite Systems (GNSS) and cellular networks has attracted special attention along the different network generations. Cellular systems are typically considered to complement the lack of Global Navigation Satellite Systems (GNSS) visibility in urban environments. Most of these hybrid GNSS/LTE navigation solutions are necessary to filter noisy GNSS or LTE cellular position measurements over time. Furthermore, the cellular propagation channels are dominated by non-line-of-sight (NLoS) conditions and dense multipath. The position errors are above 50 m with 20-MHz Long Term Evolution (LTE) signals from field measurements. Therefore, the 5G new radio (NR) features, such as wideband signals, massive antenna arrays, millimeter wave (mm Wave) transmissions, ultra-dense networks and device-to-device (D2D) communications, are expected to significantly enhance the hybrid positioning performance with Global Navigation Satellite Systems (GNSS). These NR features introduces high-accuracy ranging and angle measurements with a high network density, which are envisaged to achieve high-accuracy positioning. In addition, the 5G centimeter-wave (cave) transmissions with extended bandwidths are also of interest in macro-cell deployments. In this sense, the 3GPP standard has just approved a new study item on 5G NR positioning, however, there is a limited literature on the integration of Global Navigation Satellite Systems (GNSS) and 5G technologies.

The supported positioning methods in Long-Term Evolution (LTE) rely on the high-level network architecture shown in FIG. 1. There are three main elements involved in the process, the Location Service Client (LCS), the LCS Server (LS) and the LCS Target. A client, i. e. the requesting service, is in the majority of the cases installed or available on the LCS target. The client obtains the location information by sending a request to the server. The location server is a physical or logical entity that collects measurements and other location information from the device and base station and assists the device with measurements and estimating its position. The server basically processes the request from the client and provides the client with the requested information and optionally with velocity information. There are two different possibilities for how the device (client) can communicate with the location server. There is the option to do this over the user plane (U-Plane), using a standard data connection, or over the control plane (C-Plane). In the control plane the E-SMLC (Evolved Serving Mobile Location Center) is of relevance as location server, whereas for the user plane this is handled by the SUPL Location Platform.

5G communications networks are expected to provide huge improvements in the capacity, number of connected devices, energy efficiency, and latencies when compared to existing communications systems. These features will be enabled by the combination of higher bandwidths, advanced antenna technologies, and flexible radio access solutions, among others. Especially in urban environments, 5G networks are also expected to consist of densely distributed access nodes (ANs). Consequently, a single user equipment (UE) in such dense networks is within coverage range to multiple closely located access nodes (ANs) at a time. Such short user equipment (UE)-access nodes (ANs) distances provide obvious benefits for communications, e.g., due to lower propagation losses and shorter propagation times, but interestingly can also enable highly accurate user equipment (UE) positioning. Altogether, 5G networks allow for many opportunities regarding acquisition and exploitation of UE location information.

One of the improvements in 5G networks concerns the positioning accuracy. It is stated that 5G should provide a positioning accuracy in the order of one meter or even below. That is significantly better than the accuracy of a couple of tens of meters provided in long term evolution (LTE) systems by observed time difference of Observed Time Difference of Arrival (OTDOA) techniques. The required positioning accuracy in 5G networks will outperform also commercial global navigation satellite systems (GNSSs) where the accuracy is around 5m, and wireless local area network (WLAN) fingerprinting resulting in a 3m-4m accuracy. Another improvement that 5G networks may provide concerns the energy efficiency of positioning. This stems from the common assumption that 5G networks will exploit frequently transmitted uplink (UL) pilot signals for channel estimation purposes at the ANs. These signals can be used also for positioning in a network centric manner where the UE location is estimated either independently in the ANs or in a centralized fusion center, assuming known AN locations, and thus no calculations are needed in the mobile UEs. Note that this is a considerable difference to the device-centric positioning, e.g., Global Navigation Satellite Systems (GNSS), where the mobile UEs are under heavy computational burden. Therefore, network-centric positioning techniques provide significant power consumption improvements and enable ubiquitous high-accuracy positioning that can run in the background continuously. Such a functionality decreases also the signaling overhead when the location information is to be used on the network side, but on the other hand, requires additional care for privacy as the positioning is not carried out at the UEs themselves. As a third improvement in 5G-based positioning, regardless whether it is network- or device-centric, location information can be obtained in complete independence of UE satellite connections everywhere under the network coverage area, including also challenging indoor environments.

Positioning information is a central element towards self-driving vehicles, intelligent traffic systems (ITSs), drones as well as other kinds of autonomous vehicles and robots. Location-awareness can be exploited also in the UEs as well as by third parties for providing other than purely communications type of services. Taking traffic and cars as an example, up-to-date location information and predicted UE trajectories can provide remarkable improvements, e.g., in terms of traffic flow, safety and energy efficiency. When comprehensively gathered car location information is shared with ITSs, functionalities such as traffic monitoring and control can be enhanced. Accurate location information is needed also in the cars themselves, e.g., for navigation purposes, especially when considering autonomous and self-driving cars. Location-awareness is required also for collision avoidance. Within communications range cars can report their location directly to other cars, but when the link between the cars is blocked, location notifications are transmitted in collaboration with ITSs. Naturally, the demands and functionalities regarding self-driving cars cannot be met everywhere and at all times by existing communications systems and satellite based positioning. Consequently, advanced communications capabilities and network-based positioning in 5G is likely to play an important role in the development of self-driving car systems.

The ever-increasing tendency of developing mobile applications for everyday use has ultimately entered the automotive sector. Vehicle connectivity with mobile apps have the great potential to offer a better and safer driving experience, by providing information regarding the surrounding vehicles and infrastructure and making the interaction between the car and its driver much simpler. The fact that apps may significantly improve driving safety has attracted the attention of car users and caused a rise in the number of new apps developed specifically for the car industry. This trend has such a great influence that now manufacturers are beginning to design cars taking care of their interaction with mobile phones.

Vehicle-to-pedestrian collision avoidance methods and systems require precise spatiotemporal positioning accuracies of the order of 1 meter or less, in order to discriminate for example a pedestrian crossing the street from a pedestrian walking on the sidewalk where significant V2P collision probability differences exist. In currently deployed Long-Term Evolution (LTE) networks, the level of spatiotemporal positioning accuracy is on the order of tens of meters, which may not provide enough positioning discrimination and therefore may limit the applicability of currently deployed Long-Term Evolution (LTE) networks for accurate vehicle-to-pedestrian collision avoidance. In currently deployed Global Positioning System (GPS), the level of spatiotemporal positioning accuracy is on the order of 5 meters, but exhibits some urban coverage drawback, seconds-level measurement latencies, and high battery electrical consumption, which may not provide enough spatiotemporal positioning discrimination and therefore may limit the applicability of GPS for accurate vehicle-to-pedestrian collision avoidance. Therefore, there is still a need for a method and system for vehicle-to-pedestrian collision avoidance, where upcoming 5G-LTE communications networks and New Radio (NR) technologies may provide for accurate vehicle-to-pedestrian collision avoidance.

There is still a need for a method and system for vehicle-to-pedestrian collision avoidance.

SUMMARY OF THE INVENTION

More specifically, in accordance with the present invention, there is provided a method for vehicle-to-pedestrian collision avoidance, comprising physically linking at least one vehicle to at least one Long-Term Evolution (LTE)-capable user equipment (UE) terminal; physically linking at least one pedestrian to at least one Long-Term Evolution (LTE)-capable user equipment (UE) terminal; determining a spatiotemporal positioning of each terminal determined from Long Term Evolution (LTE) cellular radio signals mediated by at least three Long-Term Evolution (LTE) cellular base stations (BS) and at least one Location Service Client (LCS) server; wherein the at least one Location Service Client (LCS) server includes an embedded artificial intelligence algorithm comprising a Recurrent Neural Network (RNN) algorithm to analyze the spatiotemporal positioning of the terminals and determine a likely future trajectory of the at least one vehicle and the at least one pedestrian so as to maximize a reward metric based on Reinforcement Learning (RL) analysis; and the at least one Location Service Client (LCS) server communicates the likely future trajectory of the at least one vehicle and the at least one pedestrian to the at least one terminal physically linked to the at least one pedestrian; the at least one terminal physically linked to the at least one pedestrian including an embedded Artificial Intelligence algorithm comprising a Conditional Random Fields (CRFs) algorithm to determine if the likely future trajectory of the at least one pedestrian is below a vehicle-to-pedestrian proximity threshold limit; and, if the proximity threshold limit is reached, the terminal physically linked to the at least one pedestrian communicates a collision-avoidance emergency signal to the at least one pedestrian and to the at least one vehicle that meet the proximity threshold limit.

There is further provided a vehicle-to-pedestrian collision avoidance system, comprising participants consisting of a set of at least two Long-Term Evolution (LTE)-capable user equipment (UE) terminals physically linked to at least one vehicle and at least one pedestrian; wherein a spatiotemporal positioning of the terminals is determined from Long Term Evolution (LTE) cellular radio signals mediated by at least three Long-Term Evolution (LTE) cellular base stations (BS) and at least one Location Service Client (LCS) server; the at least one Location Service Client (LCS) server includes an embedded Artificial Intelligence algorithm comprising a Recurrent Neural Network (RNN) algorithm, analyzes the spatiotemporal positioning of the terminals and determines the likely future trajectory of the participants so as to maximize a reward metric based on Reinforcement Learning (RL) analysis; and communicates the likely future trajectory of the participants to the terminals physically linked to the at least one pedestrian; the terminals physically linked to the at least one pedestrian include an embedded Artificial Intelligence algorithm comprising a Conditional Random Fields (CRFs) algorithm to determine if the likely future trajectory of the at least one pedestrian is below a vehicle-to-pedestrian proximity threshold limit and, if this condition is reached, the terminal physically linked to the at least one pedestrian communicates a collision-avoidance emergency signal to at least one of: the at least one pedestrian and the at least one vehicle that meet the proximity threshold limit.

Other objects, advantages and features of the present invention will become more apparent upon reading of the following non-restrictive description of specific embodiments thereof, given by way of example only with reference to the accompanying drawings

BRIEF DESCRIPTION OF THE DRAWINGS

In the appended drawings:

FIG. 3 is a schematic view of a 2D map that may be used to classify spatiotemporal coordinates of pedestrians and vehicles depending on a level of risk probability of identified spaces according to an embodiment of an aspect of the present invention;

FIG. 4 shows prediction of likely future trajectory or position of a participant based on previous spatiotemporal positioning as determined by Long-Term Evolution (LTE)-based or Global Navigation Satellite Systems (GNSS)-based techniques or a combination thereof according to an embodiment of an aspect of the present invention;

FIG. 15 is a schematic view of User Equipment (UE) terminals physically linked to vehicles and/or pedestrians that may receive geolocation input from other types of sensors distributed in the urban environment.

DETAILED DESCRIPTION OF THE INVENTION

A method and a system for vehicle-to-pedestrian (V2P) collision avoidance, in the field of intelligent transportation technology and data analytics with an Artificial Intelligence (AI) algorithm embedded in a User Equipment (UE) terminal aiming at vehicle-to-pedestrian (V2P) collision avoidance, will now be described by the following non-limiting examples.

Figure 1:
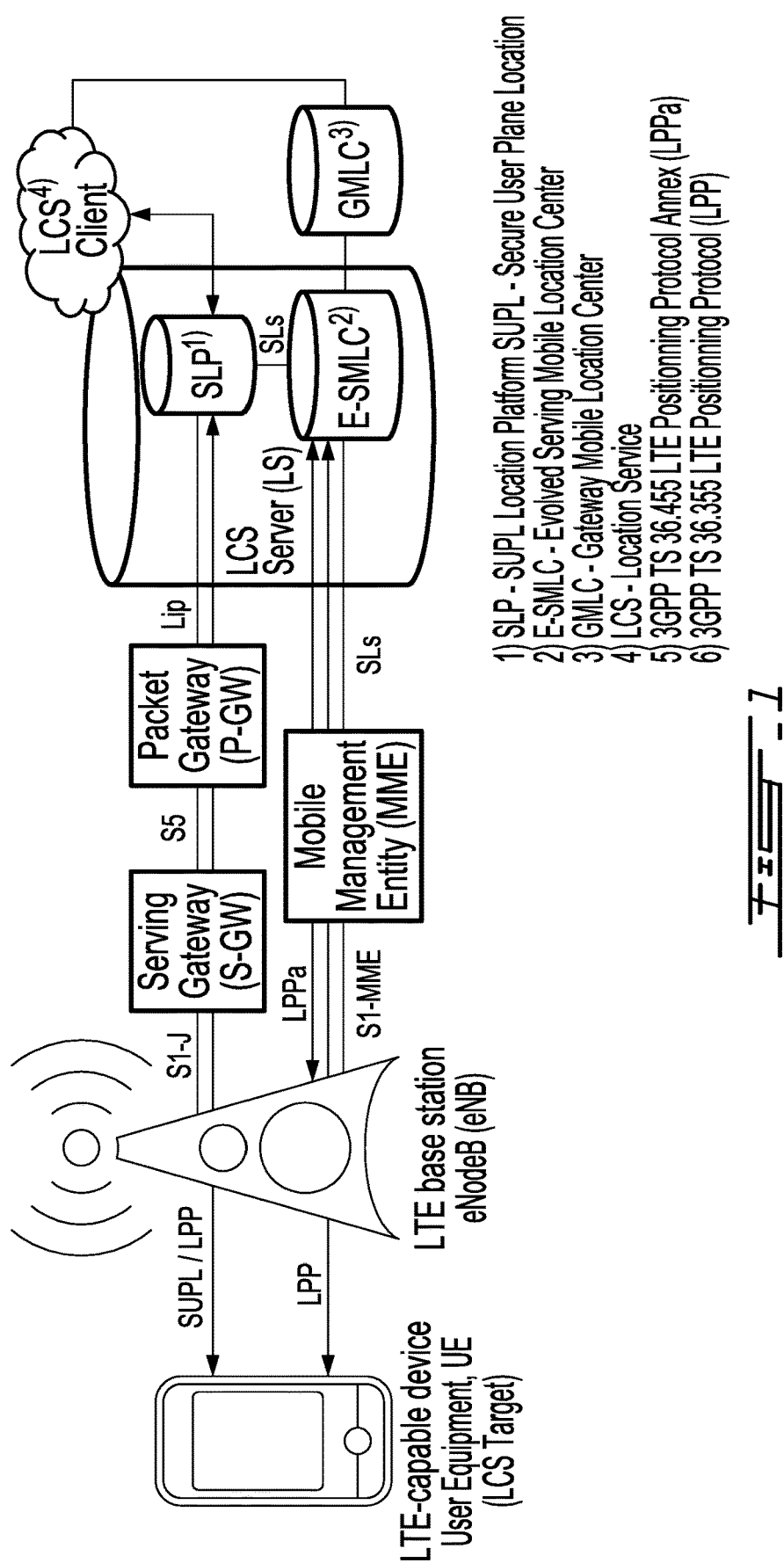
FIG. 1 is a schematic view of a high-level network architecture supporting Long-Term Evolution (LTE)-based geolocation as known in the art.
Figure 2:
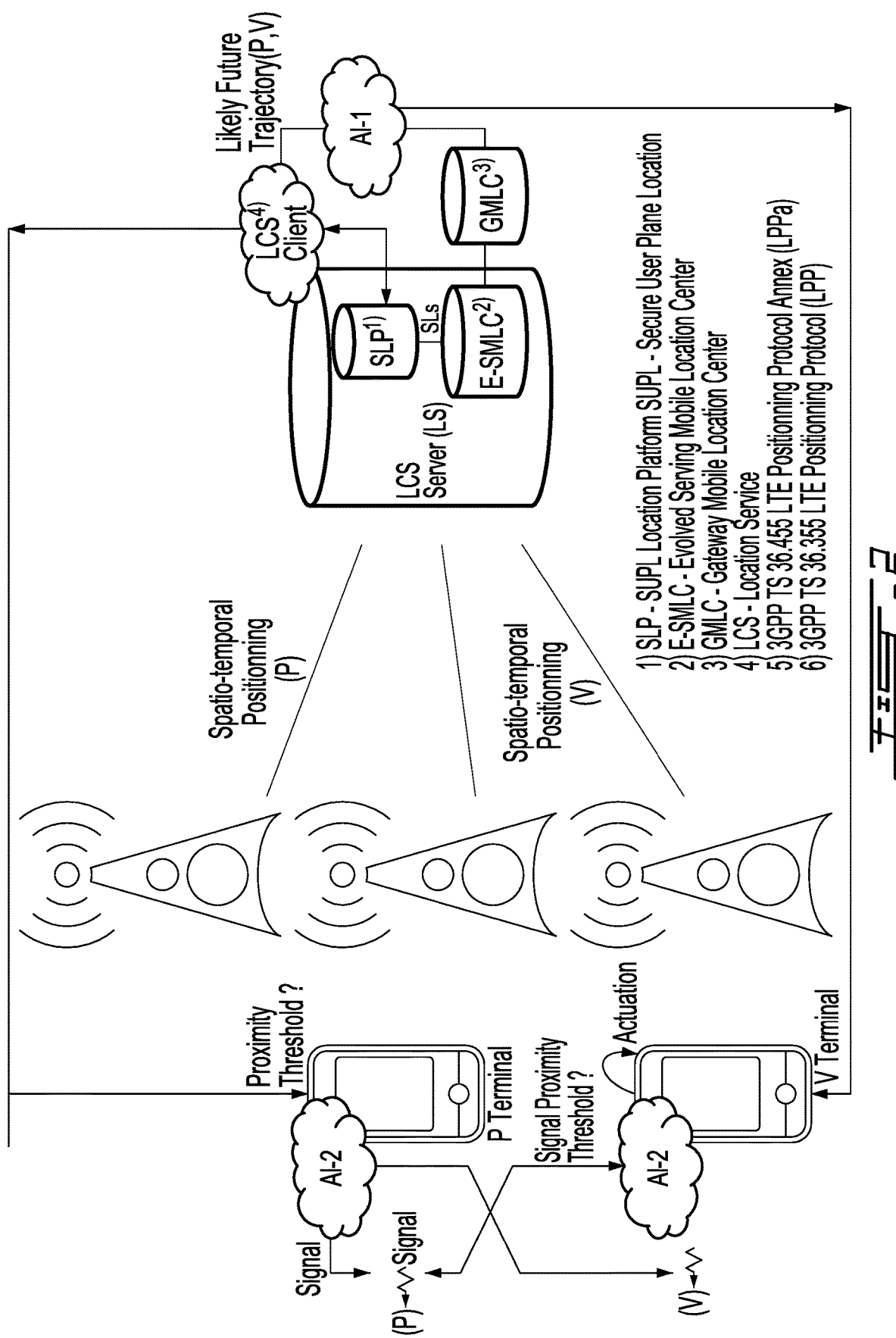
FIG. 2 is a schematic view of a system according to an embodiment of an aspect of the present invention.

A method and a system for vehicle-to-pedestrian (V2P) collision avoidance according to an embodiment of an aspect of the invention is illustrated in FIG. 2.

Vehicle-to-pedestrian (V2P) collision avoidance involves at least one vehicle (V) and at least one pedestrian (P). Each pedestrian is physically linked to at least one Long-Term Evolution (LTE)-capable user equipment (UE) terminal. Each vehicle (V) is physically linked to at least one Long-Term Evolution (LTE)-capable user equipment (UE) terminal. As used herein, the term 'physically linked' is intended to refer to a proximal combination, or association, or attachment, or coupling between a LTE-capable user equipment and a pedestrian, or a vehicle. For example, a Long-Term Evolution (LTE)-capable user equipment (UE) terminal may be physically linked to one pedestrian, such as a mobile phone, inserted in the pocket of a pedestrian, or may be physically linked to one vehicle, such as a mobile phone secured on the dash board of a vehicle.

The spatiotemporal positioning of each user equipment (UE) terminal is determined from Long Term Evolution (LTE) cellular radio signals mediated by Long-Term Evolution (LTE) cellular base stations (BS) and a Location Service Client (LCS) server. Signals from at least three cellular base stations (BS) may be used in order to use a triangulation method to determine the exact position of each user equipment (UE) terminal for positioning the exact position of each user equipment (UE) terminal by triangulation for instance.

The Location Service Client (LCS) server includes an embedded Artificial Intelligence (AI-1) algorithm, comprising a Recurrent Neural Network (RNN) algorithm for example, to analyze the spatiotemporal positioning of the terminals of the pedestrian (P) and the terminals of the vehicle (V) and determine a likely future trajectory of the pedestrian (P) and of the vehicle (V) so as to maximize a reward metric based on Reinforcement Learning (RL) analysis. As used herein, the term "reward metric" refers to the goal of minimizing the vehicle-to-pedestrian collision probability such that the Artificial Intelligence algorithm determines the best scenario for maximizing the vehicle-to-pedestrian collision avoidance probability. The LCS server communicates the likely future trajectory of the participants to the terminals physically linked to the pedestrian (P); The terminals physically linked to the pedestrian (P) include an embedded Artificial Intelligence (AI-2) algorithm comprising a Conditional Random Fields (CRFs) algorithm to determine if the likely future trajectory of the pedestrian (P) is below a vehicle-to-pedestrian (V2P) proximity threshold limit and, if this condition is met, the terminals physically linked to the pedestrian (P) communicate a collision-avoidance emergency signal to the pedestrian (P) and to the vehicle (V) that meet the proximity threshold limit.

Similarly, the LCS server communicates the likely future trajectory of the participants to the terminals physically linked to the vehicle (V); The terminals physically linked to the vehicle (V) include an embedded Artificial Intelligence (AI-2) algorithm comprising a Conditional Random Fields (CRFs) algorithm to determine if the likely future trajectory of the vehicle (V) is below a vehicle-to-pedestrian (V2P) proximity threshold limit and, if this condition is met, the terminals physically linked to the vehicle (V) communicate a collision-avoidance emergency signal to the to the pedestrian (P) and to the vehicle (V) that meet the proximity threshold limit.

The vehicle-to-pedestrian (V2P) proximity threshold limit between the participants takes into account position, speed, direction and likely future trajectories of the participants in order to determine a dimensional safety margin for establishing proper collision avoidance measures, and is of at most 10 meters, for example at most 5 meters, for example at most 1 meter.

If the signals from at least three base stations (BS) are received, triangulation techniques may be applied to the received signal level (RSSI) technique, to the time difference of arrival (TDOA) technique, or to the angle of arrival (AOA) technique, or to a combination thereof, to determine the exact position of the user equipment (UE) terminal, since the positions of the base stations (BS) are known to a high level of accuracy. The User Equipment (UE) terminal position may be determined by a combination of enhanced cell identity (E-CID), Assisted Global Navigation Satellite Systems (GNSS) information from the UE, received signal level (RSSI) technique, time difference of arrival (TDOA) technique, or angle of arrival (AOA) technique.

The Long Term Evolution (LTE) may use 5G NR new radio access technology (RAT) developed by 3GPP for the 5G (fifth generation) mobile network.

The User Equipment (UE) terminals as described herein may consist of a mobile phone, a wearable device, an Internet of Things (IoT) device, or any other Long-Term Evolution (LTE)-capable device connected to the telecommunications networks, or any combination thereof. The User Equipment (UE) terminals may comprise an application, a software, a firmware, a hardware or a device in order to store and activate the embedded Artificial Intelligence (AI-2) algorithm.

The Artificial Intelligence (AI-2) algorithm embedded within the User Equipment (UE) terminals may comprise a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof. A recurrent neural network (RNN) is a class of artificial neural network where connections between nodes form a directed graph along a temporal sequence. This allows the neural network to exhibit temporal dynamic behavior in which the spatiotemporal coordinates of a participant is denoted by a matrix X=(x,y,z,t). Reinforcement learning (RL) is an area of machine learning concerned with how participants ought to take actions in an environment so as to maximize some notion of cumulative reward. Conditional random fields (CRFs) are a class of statistical modeling method often applied in pattern recognition and machine learning and used for structured prediction.

The Artificial Intelligence (AI-1) algorithm embedded within the LCS server may comprise a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof.

The Artificial Intelligence algorithms may be used to predict the likely trajectory of participants based on small spatiotemporal data sets as well as large spatiotemporal data sets. A spatiotemporal trajectory model may be defined as a set of spatiotemporal points X=(x,y,z,t) of a participant moving along a trajectory represented by its geolocation coordinates in space and time (sequential datasets of participant, time and location). The data sets may also be spatiotemporal geolocation data that may comprise other types of data not classified as spatiotemporal points, such as image data or audio data or other types of data. In order to process sequential datasets, neural networks of deep learning (recurrent neural networks, or RNN) algorithms may be used. RNNs have been developed mostly to address sequential or time-series problems such as sensor stream data sets of various length. Also, Long Short Term Memory (LSTM) algorithms may be used, which mimics the memory to address the shortcomings of RNN due the vanishing gradient problems, preventing the weight (of a given variable input) from changing its value. RNN is an artificial neural network with hidden layer lit, referring to a recurrent state and representing a "memory" of the network through time. The RNN algorithm may use its "memory" to process sequences of inputs $x_t$. At each time step t, the recurrent state updates itself using the input variables $x_t$ and its recurrent state at the previous time step $h_{t-1}$, in the form: $h_t=f(x_t,h_{t-1})$. The function f(xt,ht−1) in turn is equal to $g(W\psi(x_t)+Uh_{t-1}+bh)$, where ψ(xt) is the function which transforms a discrete variable into a continuous representation, while W and U are shared parameters (matrices) of the model through all time steps that encode how much importance is given to the current datum and to the previous recurrent state. Variable b is a bias, if any, Whereas neural networks of deep learning models require large data sets to learn and predict the trajectory of a participant, conditional Random Fields (RFs)

may be used for the same purpose for smaller data sets. RFs may be better suited for small datasets and may be used in combination with RNN. Models with small datasets may use Reinforcement learning algorithms when trajectory predictions consider only nearest spatiotemporal geolocation data.

The Artificial Intelligence algorithms may be used to predict the likely trajectory of participants based on expanded spatiotemporal data sets and other type of data sets, which may relate to the trajectory intent of the vehicle or the pedestrian, including spatiotemporal velocity and acceleration data sets that determine spatiotemporal change of position ($dx/dt$, $dy/dt$, $dz/dt$, $d^2x/dt^2$, $d^2y/dt^2$, $d^2z/dt^2$), spatiotemporal angular, or gyroscopic, data sets that determine spatiotemporal orientation and change of orientation ($\theta_x$, $\theta_y$, $\theta_z$, $d\theta_x/dt$, $d\theta_y/dt$, $d\theta_z/dt$, $d^2\theta_x/dt^2$, $d^2\theta_y/dt^2$, $d^2\theta_z/dt^2$), or other spatiotemporal data sets or a combination thereof. A spatiotemporal trajectory model may be defined as a set of spatiotemporal points $X=(x, y, z, t)$ or a set of expanded spatiotemporal points $X=(x, y, z, t, dx/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$ of a participant moving along a trajectory represented by its geolocation, velocity, and gyroscopic coordinates in three-dimensional space and time. The RNN algorithm may use its "memory" to process sequences of inputs=$(x, y, z, t, dx/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z/dt, d^2\theta_x/dt^2, d^2\theta_y/dt^2, d^2\theta_z/dt^2)$. At each time step t, the recurrent state updates itself using the input variables $x_t$ and its recurrent state at the previous time step $h_{t-1}$, in the form: $h_t=f(x_t,h_{t-1})$.

The Artificial Intelligence algorithm embedded in the User Equipment (UE) terminals may be specific to terminals physically linked to a vehicle (V), or to terminals physically linked to a pedestrian (P), or to a LCS server of any kind. For example, the User Equipment (UE) terminals physically linked to a vehicle (V) or to a pedestrian (P) may comprise a computational unit for processing an artificial Intelligence algorithm, the computational unit being one of: a mobile application, a software, a firmware, a hardware, a physical device, and a computing device, or a combination thereof. The Artificial Intelligence algorithm may use different algorithmic codes in order to provide specific results for different User Equipment (UE) terminals, or to provide specific results for different end users, who may be related to the automobile sector, or to the cell phone sector, or to the telecommunications sector, or to the transportation sector, or to any other sectors. End users may include automobile OEMs, or cell phone applications providers, or mobile telephony providers, or any other end users.

The User Equipment (UE) terminals may be physically linked to vehicles including autonomous vehicles, non-autonomous vehicles, self-driving vehicles, off-road vehicles, trucks, manufacturing vehicles, industrial vehicles, safety & security vehicles, electric vehicles, low-altitude airplanes, helicopters, drones (UAVs), boats, or any other types of automotive, aerial, or naval vehicles with some proximity to pedestrians such as encountered in urban, industry, airport, or naval environments. The User Equipment (UE) terminals physically linked to vehicles may comprise a computational unit for processing an artificial Intelligence algorithm, the computational unit being one of: a mobile application, a software, a firmware, a hardware, a physical device, and a computing device, or a combination thereof, which may be connected to the artificial Intelligence algorithm (AI-2) to determine if the likely future trajectory of the vehicles is below a vehicle-to-pedestrian (V2P) proximity threshold limit and, if this condition is met, to communicate a collision-avoidance emergency signal. The signal may take the form of a direct actuation on the vehicle, including changing the direction of the vehicle (e.g. course correction), or changing the speed of the vehicle (e.g. applying brakes), or sending a signal to the pedestrian (e.g. visual or audio signaling), or any other actuation measures by direct action on the vehicle's controls for collision avoidance. For example, the collision-avoidance emergency signal comprises a decision process for enabling at least one of: changing the direction of the vehicle; changing the speed of the vehicle; and sending a signal to the at least one pedestrian.

The User Equipment (UE) terminals physically linked to vehicles may receive geolocation input from other types of sensors including for example any one of Global Navigation Satellite Systems (GNSS) (or GPS), camera, sonar, lidar, radar, accelerometry, inertial, or gyroscopic sensors, or any other sensors or a combination thereof. The Artificial Intelligence algorithm (AI-1) may weight or prioritize Long-Term Evolution (LTE) inputs, or GPS inputs, or camera inputs, or sonar inputs, or lidar inputs, or radar inputs, or accelerometry inputs, or gyroscopic inputs depending on the accuracy or reliability of each inputs. The position of the User Equipment (UE) terminals physically linked to vehicles may be determined by other types of sensors embedded in the terminals including any one of Global Navigation Satellite Systems (GNSS), camera, sonar, lidar, radar, accelerometry, or gyroscopic sensors, or any other sensors or a combination thereof.

The User Equipment (UE) terminals may be physically linked to pedestrians including sidewalk pedestrians, on-road pedestrians, intersection pedestrians, construction workers, manufacturing workers, safety & security workers, airport workers, naval workers, wheelchair users, bicycle drivers, pets, or any other types of pedestrians. The User Equipment (UE) terminals physically linked to pedestrians may comprise an application, a software, a firmware, a hardware or a physical or computing device, which may be connected to the artificial Intelligence algorithm (AI-2) to determine if the likely future trajectory of the pedestrians is below a vehicle-to-pedestrian (V2P) proximity threshold limit and, if this condition is met, to communicate a collision-avoidance emergency signal. The signal may take the form of a direct actuation on the vehicle meeting the proximity threshold limit, including changing the direction of the vehicle (e.g. course correction), or changing the speed of the vehicle (e.g. applying brakes), or sending a signal to the pedestrian (e.g. visual or audio signaling), or any other actuation measures by direct action on the vehicle's controls for collision avoidance, or a combination thereof.

The User Equipment (UE) terminals physically linked to pedestrians may receive geolocation input from other types of sensors including for example any one of GPS, camera, sonar, lidar, radar, accelerometry, inertial, or gyroscopic sensors, or any other sensors or a combination thereof. The Artificial Intelligence algorithm may weight or prioritize Long-Term Evolution (LTE) inputs, or GPS inputs, or camera inputs, or sonar inputs, or lidar inputs, or radar inputs, or accelerometry inputs, or gyroscopic inputs depending on the accuracy or reliability of each inputs. The position of the User Equipment (UE) terminals physically linked to pedestrians may be determined by other types of sensors embedded in the terminals including any one of Global Navigation Satellite Systems (GNSS), camera, sonar, lidar, radar, accelerometry, or gyroscopic sensors, or any other sensors or a combination thereof.

FIG. 3 is a schematic of application of a 2D map that may be used to classify spatiotemporal coordinates of pedestrians (P) and vehicles (V) depending on a level of risk probability of identified spaces. For example, spatial coordinates coincident with sidewalks (A) may be classified as low-probability collision zones between pedestrian and vehicle. Spatial coordinates coincident with streets (B) may be classified as high-probability collision zones between pedestrian and vehicle. Spatial coordinates coincident with indoor locations (C) may be considered as safe zones.

FIG. 4 shows prediction of likely future trajectory or position (30) of a participant (32) based on previous spatiotemporal positioning as determined by Long-Term Evolution (LTE)-based or Global Navigation Satellite Systems (GNSS)-based techniques or a combination thereof (34). Likely future trajectory or position (30) of a participant (32) may be determined by an embedded Artificial Intelligence (AI-2) algorithm comprising a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof. Likely future trajectory or position (30) of a participant (32) may be based on an analysis of the participant's previous spatiotemporal coordinates, its instant position, its speed, and on a level of risk probability of identified spaces. Also, likely future trajectory or position (30) of a participant (32) may be based on an analysis of the participant's previous spatiotemporal trajectory model that may be defined as a set of spatiotemporal points X=(x, y, z, t) or as a set of expanded spatiotemporal points X=(x, y, z, t, dx/dt, dy/dt, dz/dt, $d^2x/dt^2$, $d^2y/dt^2$, $d^2z/dt^2$, $\theta_x$, $\theta_y$, $\theta_z$, $d\theta_x/dt$, $d\theta_y/dt$, $d\theta_z/dt$, $d^2\theta_x/dt^2$, $d^2\theta_y/dt^2$, $d^2\theta_z/dt^2$) of a participant moving along a trajectory represented by its geolocation, velocity.

Figure 5:
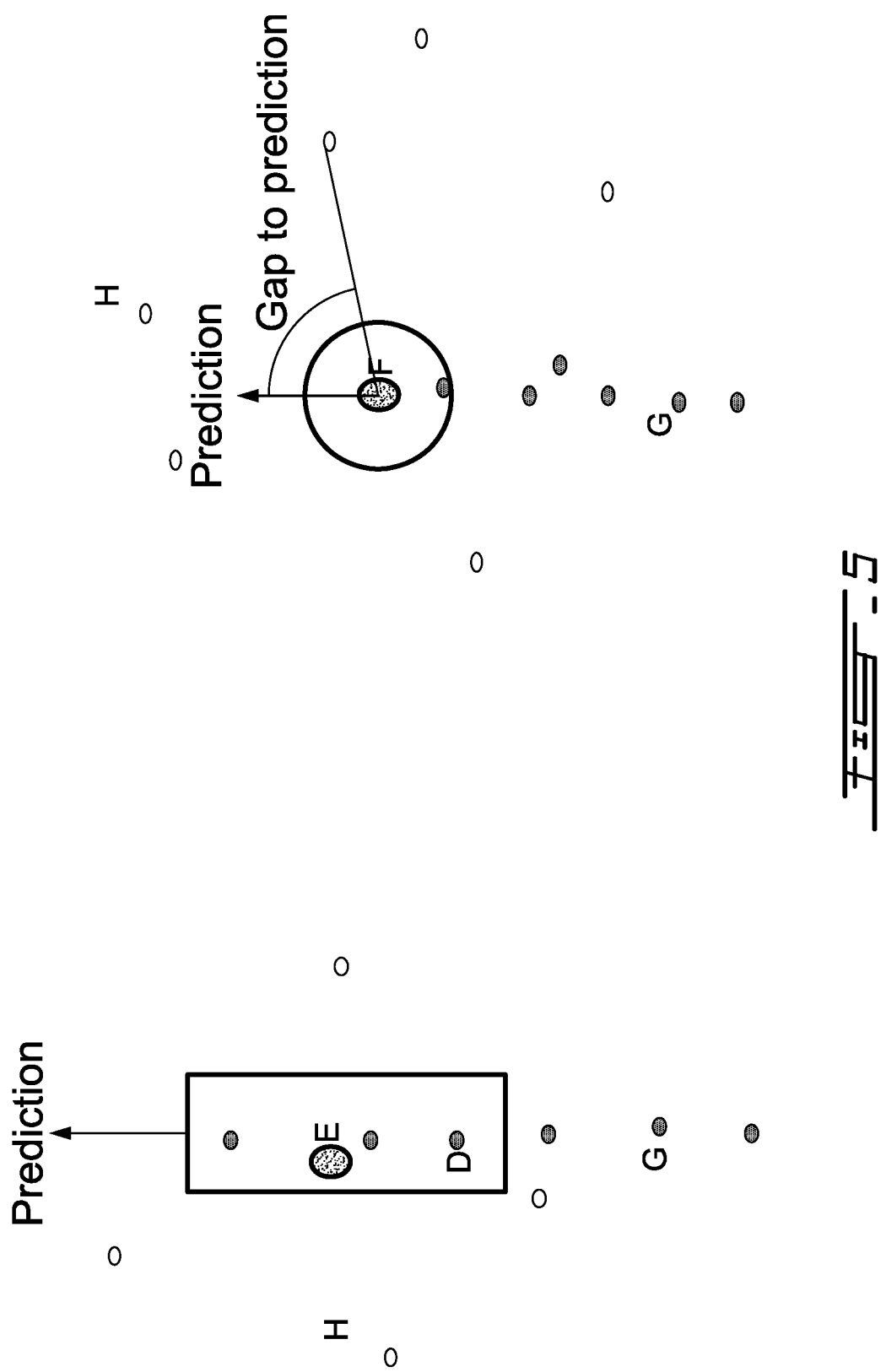
FIG. 5 illustrates a method for isolating and discarding spatiotemporal coordinates that are out of norm behaviour, according to an embodiment of an aspect of the present invention.

FIG. 5 shows the use of an embedded artificial intelligence algorithm based on a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof) to isolate and discard spatiotemporal coordinates of a pedestrian (F) or a vehicle (E) that are out of norm behaviour (H), where (G) represents past and coherent spatiotemporal coordinates. Out of norm coordinates (H) can be incoherent, absent or too different from the position's prediction: they may result from a geographic zone inferring with the Long-Term Evolution (LTE) device operation such as for example a space between two buildings where walls attenuates Long-Term Evolution (LTE) signals or an otherwise defective user equipment (EU).

Figure 6:
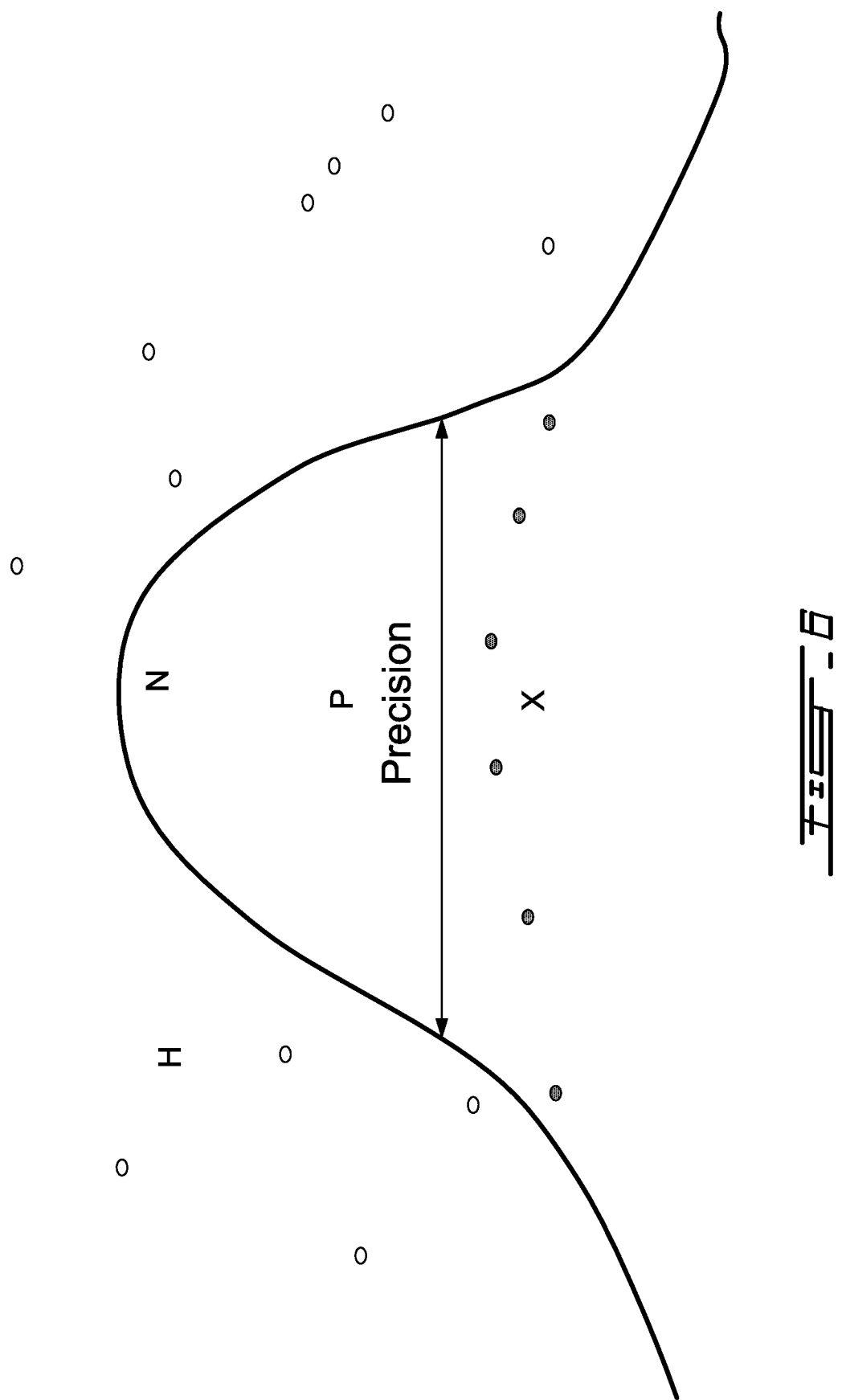
FIG. 6 is a graphic representation of acceptance or rejection of normal and abnormal or incoherent spatiotemporal coordinates.

FIG. 6 is a graphic representation of acceptance or rejection by the norm (N) of normal (X) and abnormal or incoherent (H) spatiotemporal coordinates, respectively, and their classification according to a precision (P) set by the system for a specific pedestrian, device, vehicle, geographic area or at large. The precision (P) is selected in order to disqualify out of bound results from normal movement. The norm (N) can follow many possible mathematic distributions and selected according to specific UE, specific pedestrian, specific Long-Term Evolution (LTE) device, specific vehicle or geographic area.

Figure 7:
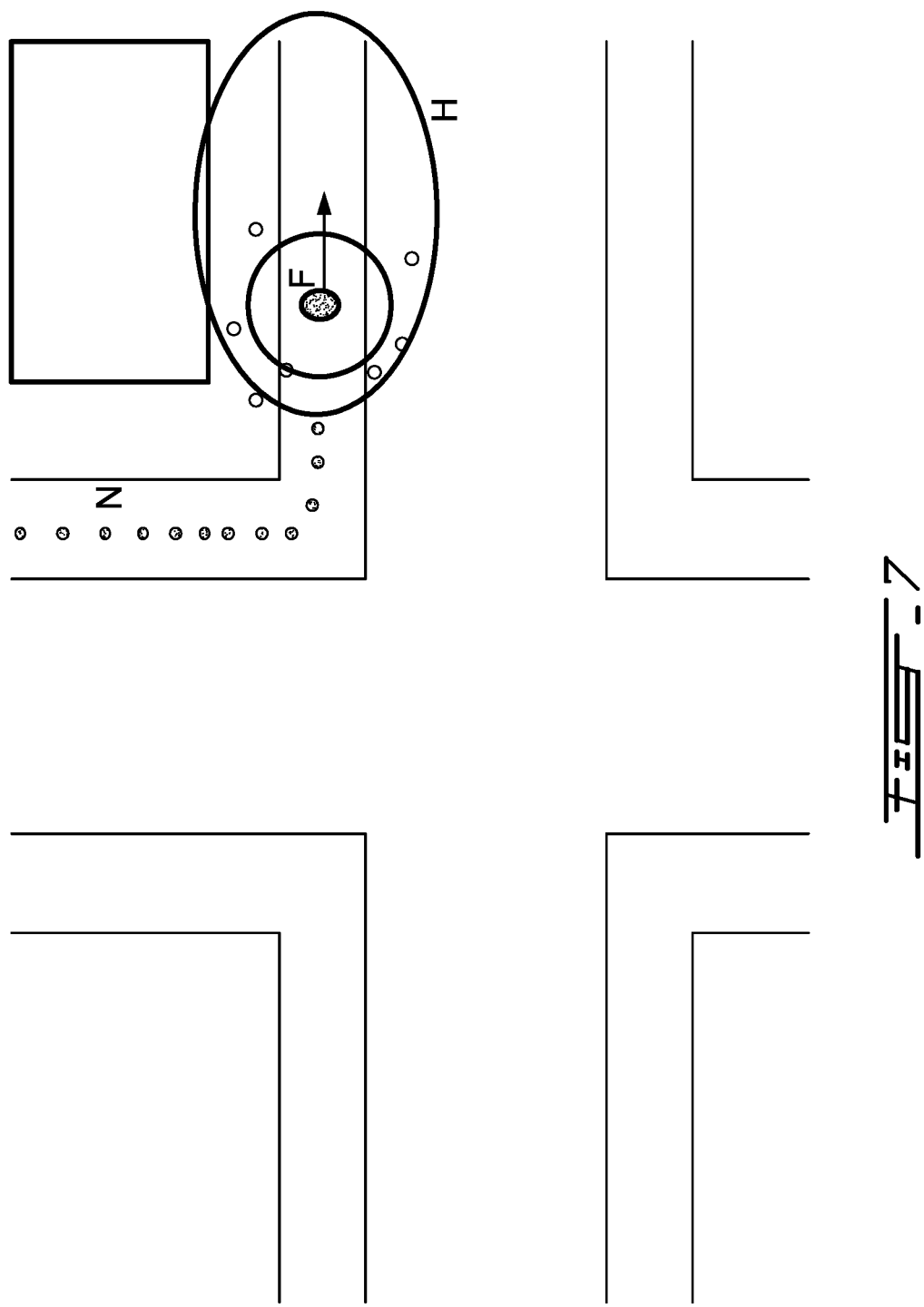
FIG. 7 illustrates a case when a UE terminal linked to a pedestrian (F) exhibiting a normal path (N) starts to exhibit incoherent, absent or out of norm Long-Term Evolution (LTE)-determined spatiotemporal coordinates (H) when passing buildings attenuating Long-Term Evolution (LTE) signals, according to an embodiment of an aspect of the invention.

FIG. 7 illustrates a case where a UE terminal linked to a pedestrian (F) exhibiting a normal path (N) starts to exhibit incoherent, absent or out of norm Long-Term Evolution (LTE)-determined spatiotemporal coordinates (H) when passing buildings attenuating Long-Term Evolution (LTE) signals for instance. These spatiotemporal coordinates (H) may be rejected, accepted or normalized using artificial intelligence based on geographic zone, weather, location signal, device, vehicle or user. For example, suddenly random spatiotemporal coordinates may be immediately rejected, whereas a linear progression of spatiotemporal coordinates coincident with a sidewalk or some other safe area may be accepted. A linear progression of coordinates suspected to be altered by, for instance, weather or surrounding elements may be normalized, i.e. recalculated and then considered reliable spatiotemporal coordinates.

Figure 8:
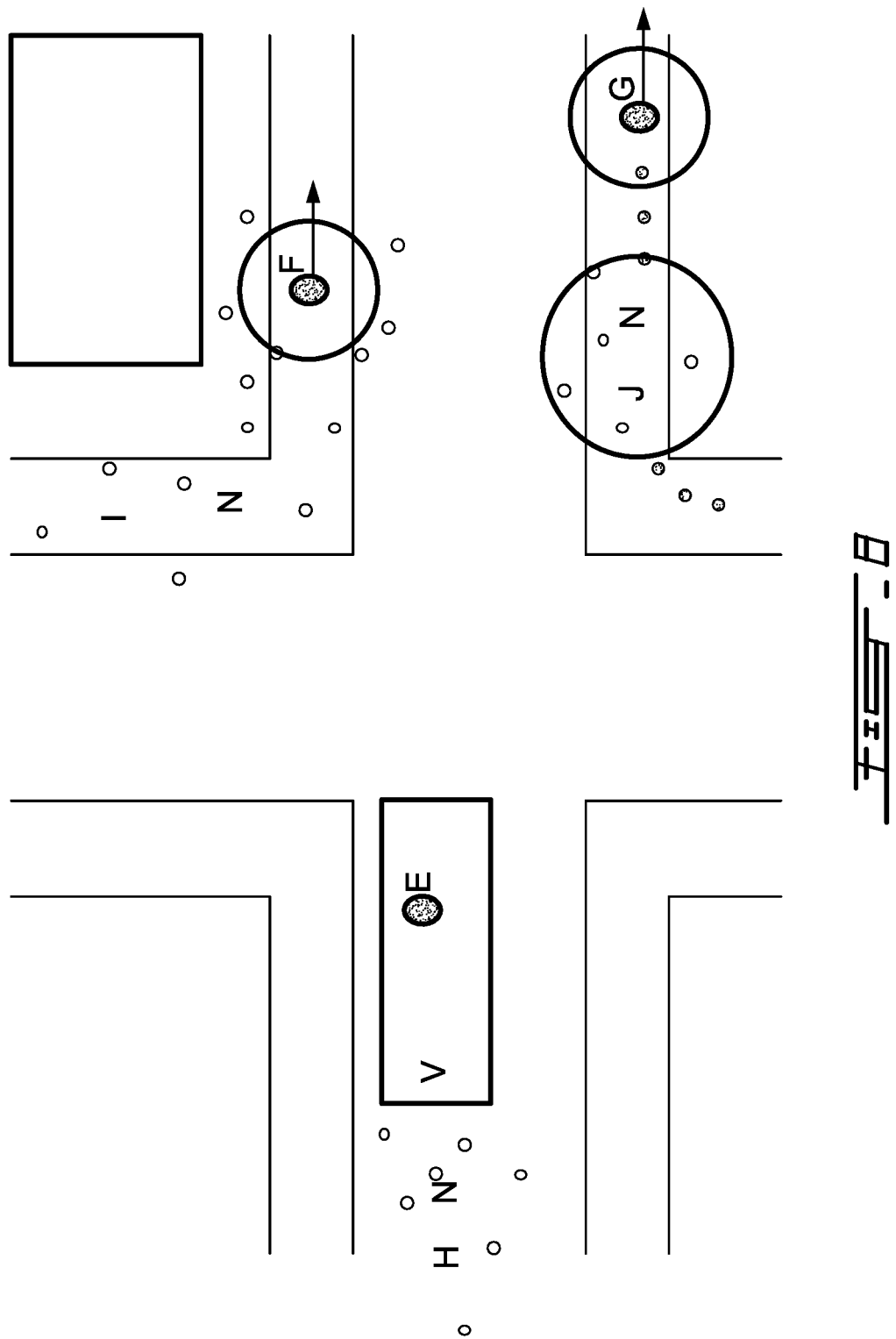
FIG. 8 illustrates a case when UE terminals linked to pedestrians (F, G) and a UE terminal linked to a vehicle (V) exhibiting spatiotemporal coordinates start to have incoherent, absent or out of norm spatiotemporal coordinates (H: incoherent coordinates due to defective device in vehicle V; I: incoherent coordinates due to adverse meteorological conditions that affect the signal; J: incoherent coordinates due to reflections from building walls) that can be classified and rejected, accepted or normalized using artificial intelligence, according to an embodiment of an aspect of the invention.

FIG. 8 illustrates a case where UE terminals linked to pedestrians (F, G) and a UE terminal linked to a vehicle (V) exhibiting spatiotemporal coordinates start to have incoherent, absent or out of norm spatiotemporal coordinates (H: incoherent coordinates due to defective device in vehicle V; I: incoherent coordinates due to adverse meteorological conditions that affect the signal; J: incoherent coordinates due to reflections from building walls) that can be classified and rejected, accepted or normalized using artificial intelligence based on geographic zone, weather, location signal, device, vehicle V or user. According to classification decision, an alarm can be sent to pedestrian, inboarded person or vehicle V.

Figure 9:
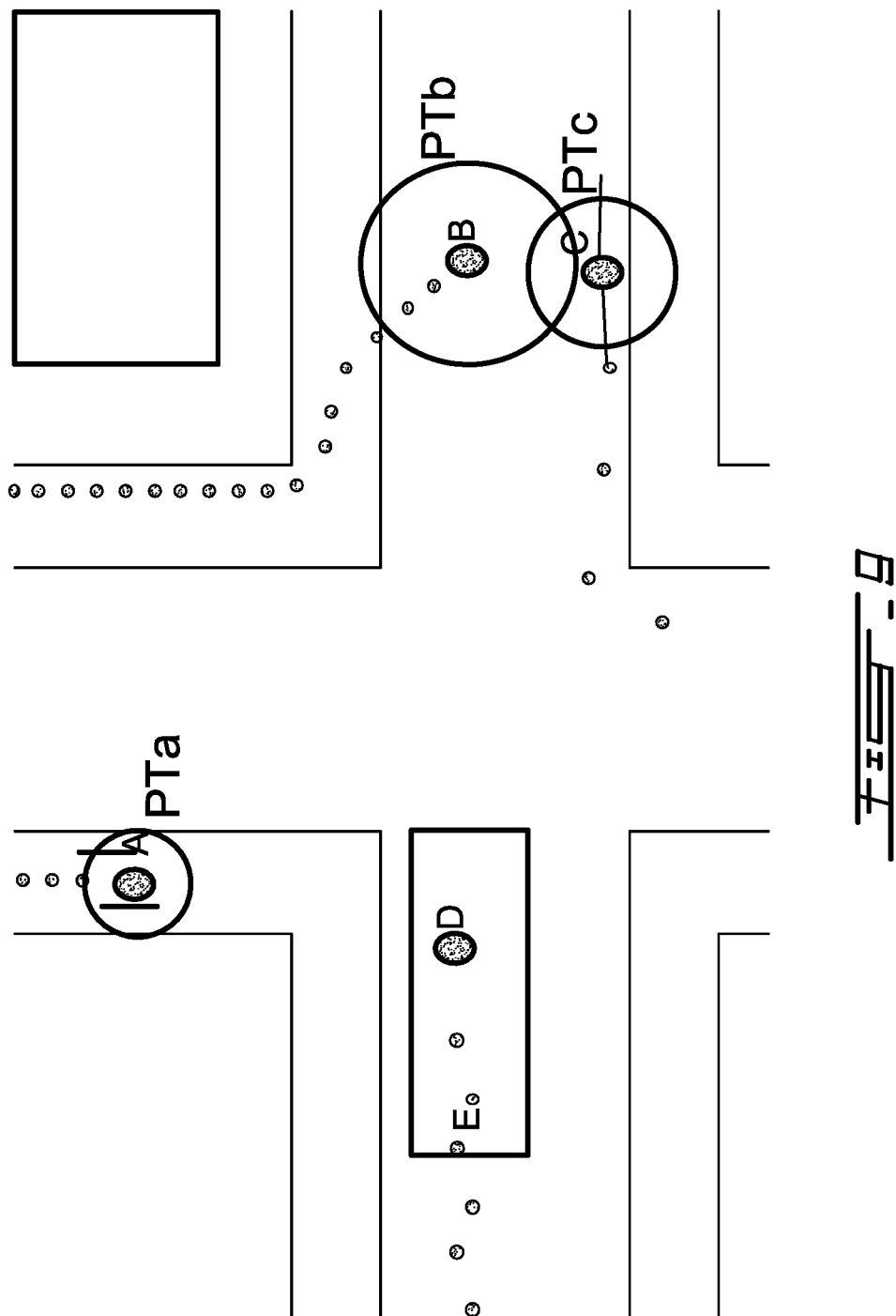
FIG. 9 illustrates a case, according to an embodiment of an aspect of the invention, where an embedded artificial intelligence algorithm can be used to identify a vehicle (D). Identification of the vehicle may be done by finding patterns in spatiotemporal coordinates differentiated from patterns in spatiotemporal coordinates of a wheelchair (A), a pedestrian crossing the street (B) or a bicycle (C)

FIG. 9 illustrates a case where an embedded artificial intelligence algorithm based on a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof, can be used to identify a vehicle (D). Identification of the vehicle may be done by finding patterns in spatiotemporal coordinates differentiated from patterns in spatiotemporal coordinates of a wheelchair (A), a pedestrian crossing the street (B) or a bicycle (C) for example. Identification method is based on patterns in spatiotemporal coordinates within mapping zones, i.e. regions of the environment as discussed hereinabove in relation to FIG. 3 for example, taking into account position, speed and direction data.

The embedded artificial intelligence algorithm may also be used to manage signal and battery life of the UE terminals and not to overload the Location Service Client (LCS) server, based on mapping zones, i.e. regions of the environment as discussed hereinabove in relation to FIG. 3 for example. Since sidewalks represent safe zones for pedestrians, the refreshing rate of collected spatiotemporal coordinates may be set to normal, for instance 2 spatiotemporal coordinates per second. In contrast, in the case of streets that represent dangerous zones for pedestrians as well as for bicycles and wheelchairs for example, the refreshing rate of collected spatiotemporal coordinates may be set to high, such as 4 spatiotemporal coordinates per second for instance. On the other hand, as indoor environments such as buildings, may be considered safe zones for pedestrians, the refreshing rate of collected spatiotemporal coordinates may be set to low, for instance 1 spatiotemporal coordinate per 30 seconds.

Still referring to FIG. 9, the embedded artificial intelligence algorithm may also be used to determine the size, area and shape of the vehicle-to-pedestrian (V2P) proximity threshold limit, based on likely future trajectories of the participants and on mapping zones (i.e. regions of the environment as discussed hereinabove in relation to FIG. 9 for example). Since sidewalks represent safe zones for pedestrians, the vehicle-to-pedestrian (V2P) proximity threshold limit for a sidewalker (PTa) may be set to the size of the sidewalk itself (usually less than 3 meters). Whereas, as streets represent dangerous zones for pedestrians as well as bicycles and wheelchairs, the vehicle-to-pedestrian (V2P) proximity threshold limit for a wheelchair riding the side of the street (PTc) may be set to a larger size (3 to 5 meters) and the vehicle-to-pedestrian (V2P) proximity threshold limit for a pedestrian crossing the middle of the street (PTb) may be set to an even larger size (above 5 meters) taking into account position, speed, direction and likely future trajectories of the participants in order to determine a dimensional safety margin for establishing proper collision avoidance measures.

The UE terminals comprise an embedded artificial intelligence algorithm (based on a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof) that is used to determine if the likely future trajectory of the participants is below a vehicle-to-pedestrian (V2P) proximity threshold limit and, if this condition is met, the terminals physically linked to the pedestrians (P) communicate a collision-avoidance emergency signal to the pedestrians (P) and to vehicles (V) that meet the proximity threshold limit. The collision-avoidance emergency signal may take the form of an audio signal, or a visual signal, or a haptic signal, or a radio signal, or any signal, or a combination thereof, adapted to the sensing ability of the pedestrians and the actuation ability of the pedestrians' UE terminals. The collision-avoidance emergency signal may also include a radio signal adapted to the actuation ability of the UE terminals linked to the vehicles meeting the proximity threshold limit. Other collision avoidance measures may also be considered.

According to an embodiment of an aspect of the present invention, the artificial intelligence algorithm embedded within the Long-Term Evolution (LTE)-capable user equipment (UE) terminals may is used for a decision process if the proximity threshold limit is reached. The decision process may be distributed over a plurality of UE terminals and over the network in order to provide redundancy for the collision-avoidance measures, as well as enhanced reliability and safety.

Figure 10:
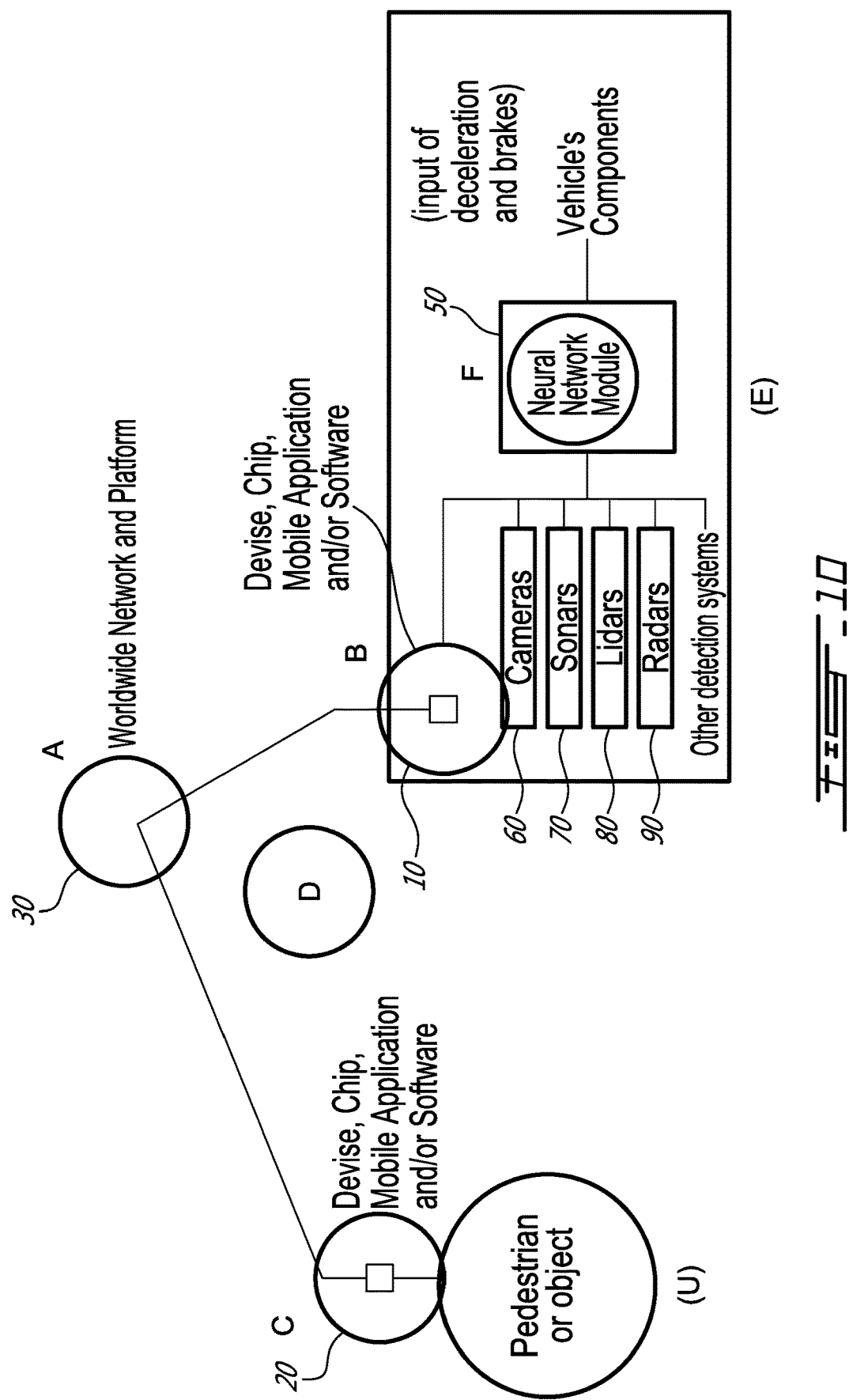
FIG. 10 illustrates redundancy of a decision process according to an embodiment of an aspect of the present invention.

FIG. 10 illustrates redundancy of the decision process according to one embodiment of the present invention. The decision process of the UE terminal physically linked to the vehicle may include measures for slowing down the vehicle, or for applying brakes, or for changing direction, taking into account position, speed, direction and likely future trajectory of other participants. The decision process of the UE terminal physically linked to the pedestrian may include measures for slowing down, moving away, or changing course, taking into account position, speed, direction and likely future trajectory of other participants. The decision process may take place within the central network and platform (A), and/or on the pedestrian's device (C), and/or in the vehicle's device (B), and/or within the vehicle's neural network module (F), and/or by fog computing (D). Other decision processes may also be considered.

Figure 11:
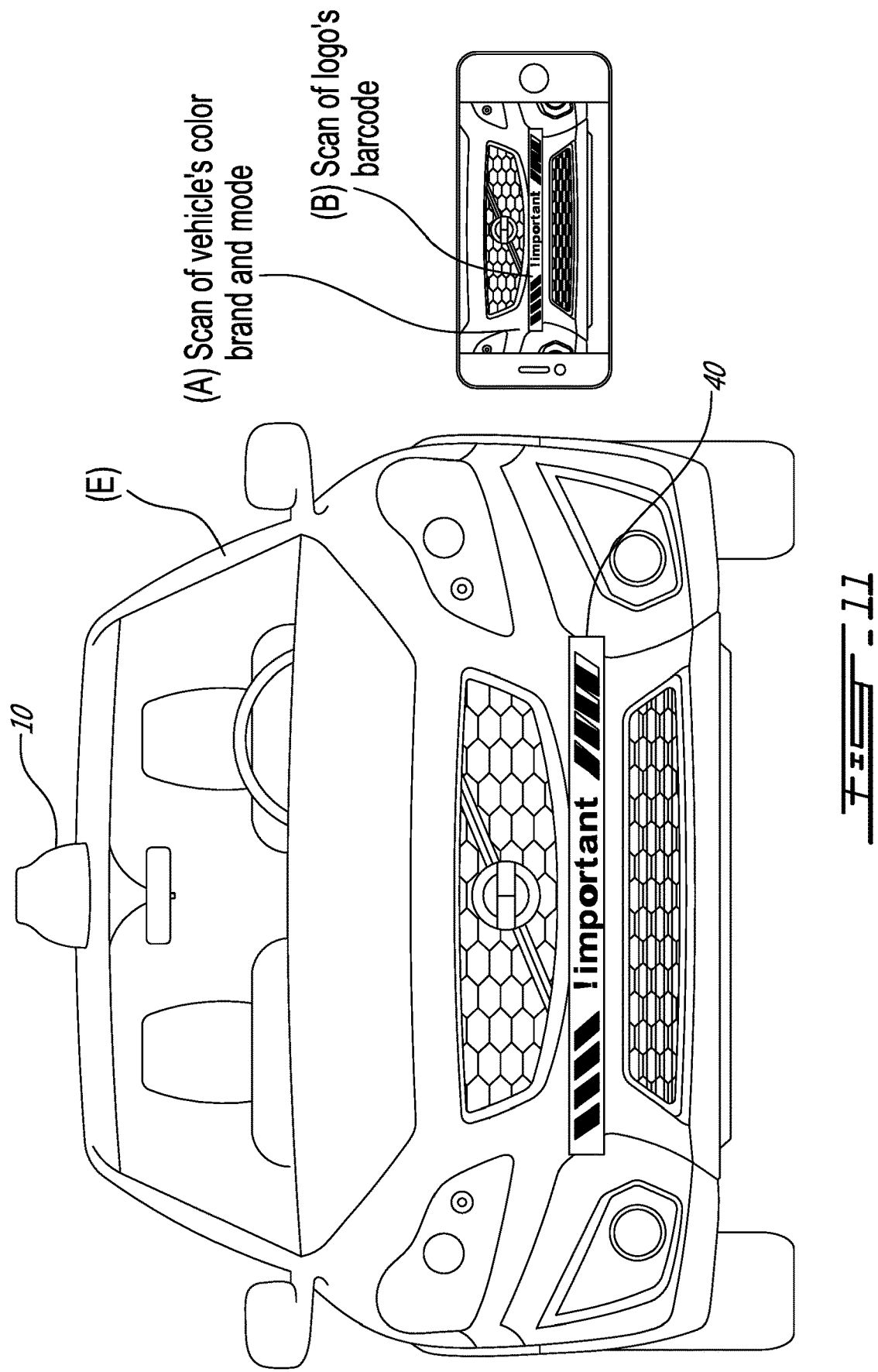
FIG. 11 illustrates a logo with proprietary bar code, which may be used for example to identify a vehicle comprising a Long-Term Evolution (LTE)-capable user equipment (UE) terminal enabled by an embedded artificial intelligence algorithm for vehicle-to-pedestrian (V2P) collision avoidance, according to an embodiment of an aspect of the invention.
Figure 12:
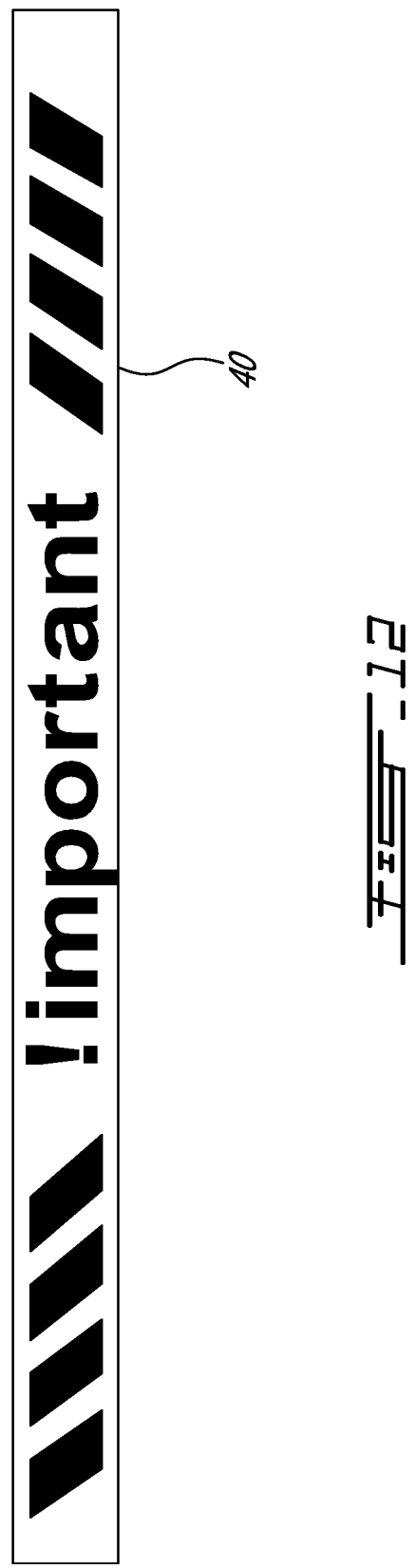
FIG. 12 is a detail of FIG. 11.

FIGS. 11 and 12 illustrate a logo with proprietary bar code, which may be used for example to identify a vehicle comprising a Long-Term Evolution (LTE)-capable user equipment (UE) terminal enabled by an embedded artificial intelligence algorithm (based on a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof) for vehicle-to-pedestrian (V2P) collision avoidance. A scan of the logo may provide inspection information or any other information related to the vehicle's brand, model and color in order to authenticate the integrality of the installed AI devices. The logo may be personalized according to the vehicle color patterns, band, model or other features and may include other authentication technologies to certify the date of installation and inspection.

Still referring to FIGS. 11 and 12, the logo with proprietary bar code may be used also to identify a pedestrian wearing a Long-Term Evolution (LTE)-capable user equipment (UE) terminal enabled by an embedded artificial intelligence algorithm (based on a recurrent neural network (RNN) algorithm, or a Reinforcement learning (RL) algorithm, or a Conditional Random Fields (CRFs) algorithm, or a machine learning (ML) algorithm, or a deep learning (DL) algorithm, or any other artificial intelligence algorithm, or a combination thereof) for vehicle-to-pedestrian (V2P) collision avoidance. The logo may consist of a tag or a label integrated to the pedestrian user equipment (UE) terminal, or to the pedestrian clothes, or to a wearable piece of textile, or to a textile apparel. A scan of the logo may provide identity information related to the pedestrian in order to authenticate the integrality of the AI devices. The logo may be personalized according to the terminal or to the clothing color patterns, band, model or other features and may include other authentication technologies to certify the date of installation and inspection.

Figure 13:
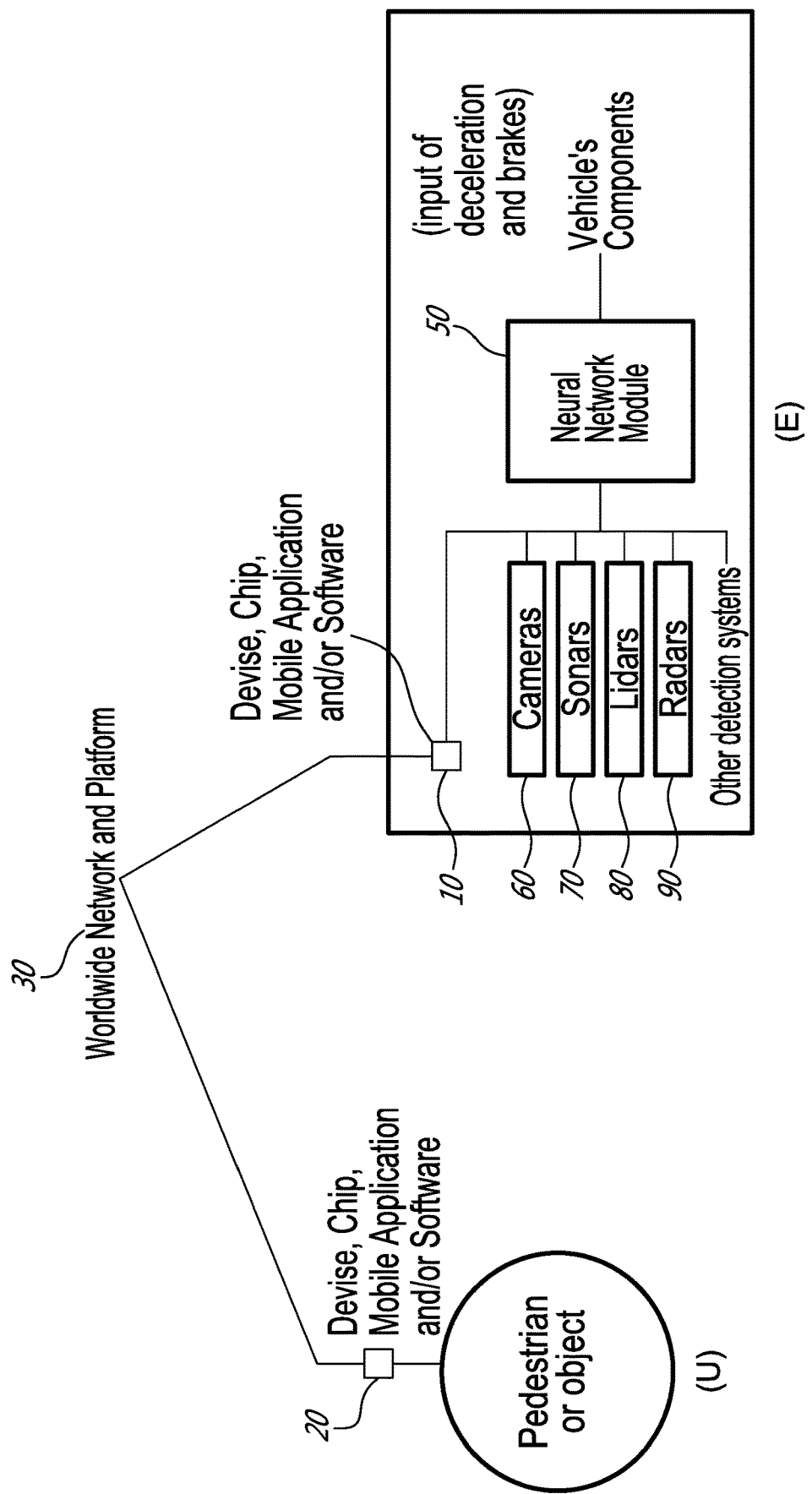
FIG. 13 is a schematic view of User Equipment (UE) terminals physically linked to vehicles that may receive geolocation input from other types of sensors, according to an embodiment of an aspect of the present invention.
Figure 14:
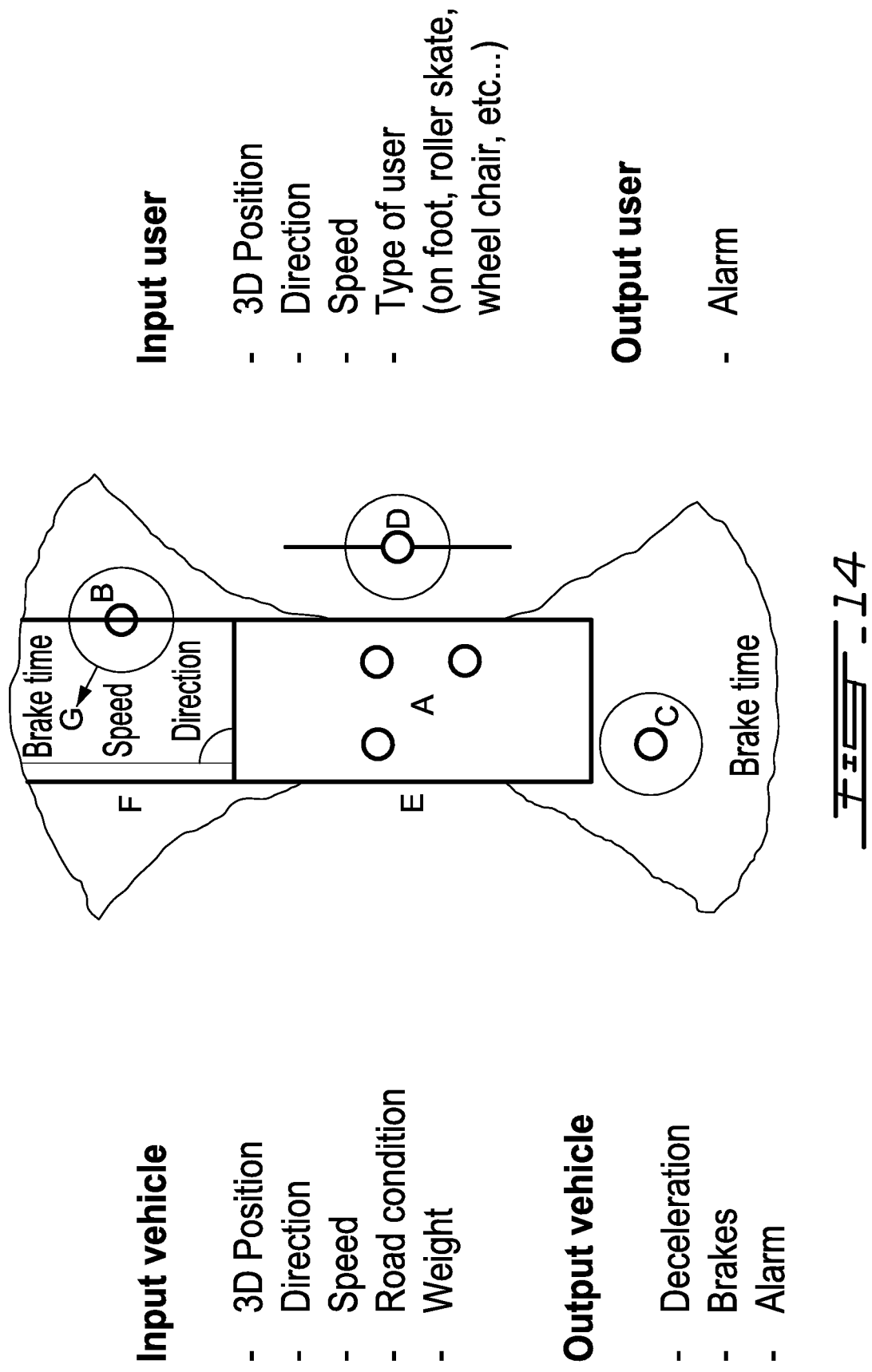
FIG. 14 is a schematic view of User Equipment (UE) terminals physically linked to vehicles that may receive geolocation input from other types of sensors, according to an embodiment of an aspect of the present invention.

FIGS. 13 and 14 shows User Equipment (UE) terminals physically linked to vehicles that may receive geolocation input from other types of sensors, according to an embodiment of an aspect of the present invention. FIG. 15 shows User Equipment (UE) terminals physically linked to vehicles and/or pedestrians that may receive geolocation input from other types of sensors distributed in the urban environment.

There is thus provided a method and a system for vehicle-to-pedestrian (V2P) collision avoidance using Artificial Intelligence (AI) algorithms embedded in User Equipment (UE) terminals for data analytics, decision and preventive action taking.

As discussed hereinabove in relation for example with FIG. 2, data analytics is performed using Artificial Intelligence (AI) algorithm embedded in User Equipment (UE) terminals. Participants consist of a set of at least two Long-Term Evolution (LTE)-capable user equipment (UE) terminals physically linked to at least one vehicle (V) and at least one pedestrian (P). The spatiotemporal positioning of the terminals is determined from Long Term Evolution (LTE) cellular radio signals mediated by at least three Long-Term Evolution (LTE) cellular base stations (BS) and at least one Location Service Client (LCS) server, which includes an embedded Artificial Intelligence (AI-1) algorithm to analyze the spatiotemporal positioning of the terminals and determine the likely future trajectory of the participants. The LCS server communicates the likely future trajectory of the participants to the terminals physically linked to the participants. The terminals physically linked to the at least one pedestrian (P) include an embedded Artificial Intelligence (AI-2) algorithm to determine if the likely future trajectory of the at least one pedestrian (P) is below a vehicle-to-pedestrian (V2P) proximity threshold limit, and, if this condition is met, the terminals physically linked to the at least one pedestrian (P) communicate a collision-avoidance emergency signal to the at least one pedestrian (P) and to the at least one vehicle (V) that meet the proximity threshold limit.

As discussed hereinabove in relation for example to FIGS. 2 and 11, the LCS server communicates the likely future trajectory of the participants to the terminals physically linked to the at least one vehicle (V). The terminals physically linked to the at least one vehicle (10) include an embedded Artificial Intelligence (AI-2) algorithm to determine if the likely future trajectory of the at least one vehicle (10) is below a vehicle-to-pedestrian (V2P) proximity threshold limit and, if this condition is met, the terminal physically linked to the at least one vehicle (10) communicates a collision-avoidance emergency signal to the at least one pedestrian (P) that meets the proximity threshold limit.

As illustrated for example in FIGS. 11, 13 and 14 for example, the User Equipment (UE) terminals physically linked to vehicles may receive geolocation input from Long-Term Evolution (LTE) geolocation inputs, and from other types of sensors including for example any one of Global Navigation Satellite Systems (GNSS) (or GPS), camera, sonar, lidar, or radar sensors, or any other sensors or a combination thereof. The Artificial Intelligence algorithm (AI-2) may weight or prioritize Long-Term Evolution (LTE) inputs, or GPS inputs, or camera inputs, or sonar inputs, or lidar inputs, or radar inputs according to the accuracy or reliability of each inputs, to the spatiotemporal position of the participants, to the road conditions, or any other data of interest.

As illustrated for example in FIG. 15 for example, the User Equipment (UE) terminals physically linked to vehicles and/or pedestrians may receive geolocation input from other types of sensors distributed in the urban environment, including for example any one of Global Navigation Satellite Systems (GNSS) (or GPS), camera, sonar, lidar, or radar sensors, or any other sensors or a combination thereof distributed in the urban environment. The sensors distributed in the urban environment may consist of Long-Term Evolution (LTE) micro-base stations, or Long-Term Evolution (LTE) femto-base stations, or sensors integrated to city lights, or sensors integrated to streetlights, or sensors integrated to traffic monitoring devices, or any other sensors or combination thereof. The sensors distributed in the urban environment may exhibit narrow or wide sensing coverages, and the sensing coverages may cover one or several streets. The Artificial Intelligence algorithm may weight or prioritize Long-Term Evolution (LTE) inputs, or GPS inputs, or camera inputs, or sonar inputs, or lidar inputs, or radar inputs according to the accuracy or reliability of each sensor inputs, to the spatiotemporal position of the participants, to the road conditions, to the weather conditions, or any other data of interest. The position of the User Equipment (UE) terminals physically linked to vehicles and/or pedestrians may be determined by other types of sensors embedded in the terminals including any one of Global Navigation Satellite Systems (GNSS), camera, sonar, lidar, or radar sensors, or any other sensors or a combination thereof, and may be assisted with a geolocation input from other types of sensors distributed in the urban environment.

The scope of the claims should not be limited by the embodiments set forth in the examples but should be given the broadest interpretation consistent with the description.

The invention claimed is:

1. A method for vehicle-to-pedestrian collision avoidance, comprising:
   physically linking at least one vehicle to at least one Long-Term Evolution (LTE)-capable user equipment (UE) terminal;
   physically linking at least one pedestrian to at least one Long-Term Evolution (LTE)-capable user equipment (UE) terminal; and
   determining a spatiotemporal positioning of each terminal determined from Long Term Evolution (LTE) cellular radio signals mediated by at least three Long-Term Evolution (LTE) cellular base stations (BS) and at least one Location Service Client (LCS) server;
   wherein the at least one Location Service Client (LCS) server includes an embedded artificial intelligence algorithm comprising a Recurrent Neural Network (RNN) algorithm to analyze the spatiotemporal positioning of the terminals and determine a likely future trajectory of the at least one vehicle and the at least one pedestrian so as to maximize a reward metric based on Reinforcement Learning (RL) analysis; and the at least one Location Service Client (LCS) server communicates the likely future trajectory of the at least one vehicle and the at least one pedestrian to the at least one terminal physically linked to the at least one pedestrian;
   the at least one terminal physically linked to the at least one pedestrian including an embedded Artificial Intelligence algorithm comprising a Conditional Random Fields (CRFs) algorithm to determine if the likely future trajectory of the at least one pedestrian is below a vehicle-to-pedestrian proximity threshold limit; and, if the proximity threshold limit is reached, the terminal physically linked to the at least one pedestrian communicates a collision-avoidance emergency signal to the at least one pedestrian and to the at least one vehicle that meet the proximity threshold limit.

2. The method of claim 1, wherein the at least one terminal physically linked to the at least one vehicle includes an embedded Artificial Intelligence algorithm comprising a Conditional Random Fields (CRFs) algorithm to determine if the likely future trajectory of the at least one vehicle is below the vehicle-to-pedestrian (V2P) proximity threshold limit and, if this condition is reached, the at least one terminal physically linked to the at least one vehicle to communicate a collision-avoidance emergency signal to the at least one pedestrian that meets the proximity threshold limit.

3. The method of claim 1, wherein the User Equipment (UE) terminals position is determined by at least one of enhanced cell identity (E-CID), Assisted Global Navigation Satellite Systems (GNSS) information from the UE, received signal level (RSSI) technique, time difference of arrival (TDOA) technique, and angle of arrival (AOA) method.

4. The method of claim 1, wherein the User Equipment (UE) terminals position is determined by at least one of enhanced cell identity (E-CID), Assisted Global Navigation Satellite Systems (GNSS) information from the UE, received signal level (RSSI) technique, time difference of arrival (TDOA) technique, and angle of arrival (AOA) method and wherein the spatiotemporal positioning of the terminals is determined by sensors embedded in the terminals, the sensors being at least one of: Global Navigation Satellite Systems (GNSS) (or GPS), camera, sonar, lidar, radar, accelerometry, inertial, and gyroscopic sensors.

5. The method of claim 1, wherein the Long Term Evolution (LTE) uses 5G NR new radio access technology (RAT) developed by 3GPP for the 5G mobile network.

6. The method of claim 1, wherein the User Equipment (UE) terminals comprise a computational unit for processing an artificial Intelligence algorithm, the computational unit being at least one of: a mobile application, a software, a firmware, a hardware, a physical device, and a computing device.

7. The method of claim 1, wherein the collision-avoidance emergency signal comprises a decision process for enabling at least one of: changing the direction of the vehicle; changing the speed of the vehicle; and sending a signal to the at least one pedestrian.

8. The method of claim 1, wherein the collision-avoidance emergency signal comprises a decision process distributed over a plurality of User Equipment (UE) and over the network in order to provide redundancy for the collision-avoidance measures and enhanced reliability and safety.

9. The method of claim 1, wherein the vehicle-to-pedestrian proximity threshold limit takes into account position, speed, direction and likely future trajectories of the participants in order to determine a dimensional safety margin for establishing proper collision avoidance measures.

10. The method of claim 1, wherein the vehicle-to-pedestrian proximity threshold limit is at most 10 meters.

11. The method of claim 1, wherein the User Equipment (UE) terminals comprise at least one of: a mobile phone, a wearable device, an Internet of Things (IoT) device; and a Long-Term Evolution (LTE)-capable device connected to the telecommunications networks.

12. The method of claim 1, wherein the User Equipment (UE) terminals include an embedded Artificial Intelligence algorithm comprising one of: a recurrent neural network (RNN) algorithm; a Reinforcement learning (RL) algorithm, a Conditional Random Fields (CRFs) algorithm; a machine learning (ML) algorithm; and a deep learning (DL) algorithm.

13. The method of claim 1, wherein the at least one vehicle is one of: an autonomous vehicle, a non-autonomous vehicle, a self-driving vehicle, an off-road vehicle, a truck, a manufacturing vehicle, an industrial vehicle, a safety and security vehicle, an electric vehicle, a low-altitude airplane, an helicopter, a drone (UAV), a boat, an aerial vehicle and a naval vehicle.

14. The method of claim 1, wherein the at least one pedestrian is one of: a sidewalk pedestrian, an on-road pedestrian, an intersection pedestrian, a construction worker, a manufacturing worker, a safety and security worker, an airport worker, a naval worker, a wheelchair user, a bicycle driver, and a pet.

15. A vehicle-to-pedestrian collision avoidance system, comprising participants consisting of a set of at least two Long-Term Evolution (LTE)-capable user equipment (UE) terminals physically linked to at least one vehicle and at least one pedestrian;
wherein a spatiotemporal positioning of the terminals is determined from Long Term Evolution (LTE) cellular radio signals mediated by at least three Long-Term Evolution (LTE) cellular base stations (BS) and at least one Location Service Client (LCS) server;
the at least one Location Service Client (LCS) server includes an embedded Artificial Intelligence algorithm comprising a Recurrent Neural Network (RNN) algorithm, analyzes the spatiotemporal positioning of the terminals and determines the likely future trajectory of the participants so as to maximize a reward metric based on Reinforcement Learning (RL) analysis; and communicates the likely future trajectory of the participants to the terminals physically linked to the at least one pedestrian;
the terminals physically linked to the at least one pedestrian include an embedded Artificial Intelligence algorithm comprising a Conditional Random Fields (CRFs) algorithm to determine if the likely future trajectory of the at least one pedestrian is below a vehicle-to-pedestrian proximity threshold limit and, if this condition is reached, the terminal physically linked to the at least one pedestrian communicates a collision-avoidance emergency signal to at least one of: the at least one pedestrian and the at least one vehicle that meet the proximity threshold limit.

16. The system of claim 15, wherein the terminals physically linked to the at least one vehicle include an embedded Artificial Intelligence algorithm comprising a Conditional Random Fields (CRFs) algorithm to determine if the likely future trajectory of the at least one vehicle is below the vehicle-to-pedestrian proximity threshold limit and, if this condition is reached, the terminal physically linked to the at least one vehicle communicates the collision-avoidance emergency signal to the at least one pedestrian that meets the proximity threshold limit.

17. The system of claim 15, wherein the Long Term Evolution (LTE) uses 5G NR new radio access technology (RAT) developed by 3GPP for the 5G (fifth generation) mobile network.

18. The system of claim 15, wherein the spatiotemporal positioning of the terminals is determined by sensors embedded in the terminals, said sensors comprising at least one of: Global Navigation Satellite Systems (GNSS, GPS), camera, sonar, lidar, radar, accelerometry, inertial, and gyroscopic sensors.

19. The system of claim 15, wherein the spatiotemporal positioning of the terminals is determined by sensors embedded in the terminals, said sensors comprising at least one of: Global Navigation Satellite Systems (GNSS, GPS), camera, sonar, lidar, radar, accelerometry, inertial, and gyroscopic sensors and wherein the spatiotemporal positioning of the terminals receives geolocation input from sensors distributed in the urban environment.

20. The system of claim 15, wherein the User Equipment (UE) terminals comprise a computational unit for processing an artificial Intelligence algorithm, the computational unit being at least one of: a mobile application, a software, a firmware, a hardware, a physical device, and a computing device.

21. The system of claim 15, wherein the collision-avoidance emergency signal comprises a decision process for enabling at least one of: changing the direction of the vehicle; changing the speed of the vehicle; and sending a signal to the at least one pedestrian.

22. The system of claim 15, wherein said participants comprise a logo with proprietary bar code.

* * * * *